United States Patent [19]

Wells et al.

[11] Patent Number: 5,420,589
[45] Date of Patent: May 30, 1995

[54] SYSTEM FOR EVALUATING THE INNER MEDIUM CHARACTERISTICS OF NON-METALLIC MATERIALS

[76] Inventors: C. T. Wells, 105 Briar Hollow La. #90, Houston, Tex. 77027; Rob Peterson, 3738 Arnold, Houston, Tex. 77005

[21] Appl. No.: 73,451

[22] Filed: Jun. 7, 1993

[51] Int. Cl.6 .............................................. G01S 13/04
[52] U.S. Cl. ...................................................... 342/22
[58] Field of Search ........................................... 342/22

[56] References Cited

U.S. PATENT DOCUMENTS

| | | | |
|---|---|---|---|
| Re. 21,955 | 11/1941 | Chaffee | 250/1 |
| 2,147,810 | 2/1939 | Alford | 250/1 |
| 3,167,767 | 1/1965 | Capelli | 343/14 |
| 3,226,714 | 12/1965 | Applegarth, Jr. | 343/6.8 |
| 3,229,286 | 1/1966 | Samuel et al. | 343/14 |
| 3,351,936 | 11/1967 | Feder | 343/5 |
| 3,392,384 | 7/1968 | Wesch | 343/5 |
| 3,424,002 | 1/1969 | Johnson | 73/290 |
| 3,427,615 | 2/1969 | Hubka | 343/14 |
| 3,665,466 | 5/1972 | Hibbard | 343/12 R |
| 3,806,795 | 4/1974 | Morey | 324/6 |
| 3,828,245 | 8/1974 | Unterberger | 324/6 |
| 3,831,173 | 8/1974 | Lerner | 342/22 |
| 3,967,282 | 6/1976 | Young et al. | 342/22 |
| 3,997,843 | 12/1976 | Wohlers | 325/105 |
| 4,008,649 | 2/1977 | Chapman | 343/5 NA |
| 4,021,725 | 5/1977 | Kirkland | 324/3 |
| 4,044,354 | 8/1977 | Bosher et al. | 343/14 |
| 4,062,010 | 12/1977 | Young et al. | 343/5 NA |
| 4,072,942 | 2/1978 | Alongi | 342/22 |
| 4,100,481 | 7/1978 | Gournay | 324/4 |
| 4,218,678 | 8/1980 | Fowler et al. | 343/5 FT |
| 4,297,699 | 10/1981 | Fowler et al. | 343/5 NA |
| 4,381,544 | 4/1983 | Stamm | 364/420 |
| 4,430,653 | 2/1984 | Coon et al. | 342/22 |
| 4,507,611 | 3/1985 | Helms | 324/323 |
| 4,698,634 | 10/1987 | Alongi et al. | 342/22 |
| 4,700,223 | 10/1987 | Shoutaro et al. | 358/93 |
| 4,743,906 | 5/1988 | Fullerton | 342/27 |
| 4,746,867 | 5/1988 | Gunton | 342/22 X |
| 4,905,008 | 2/1990 | Kawano et al. | 342/22 |
| 4,937,580 | 6/1990 | Wills | 342/22 |
| 4,951,055 | 8/1990 | Katayama | 342/22 |
| 4,967,199 | 10/1990 | Gunton et al. | 342/22 |
| 5,051,748 | 9/1991 | Pichot et al. | 342/22 |
| 5,113,192 | 5/1992 | Thomas | 342/22 |
| 5,280,284 | 1/1994 | Johler | 342/22 |

Primary Examiner—John B. Sotomayor
Attorney, Agent, or Firm—Alton W. Payne

[57] ABSTRACT

A pulse radar system for determining the subsurface structure of a medium comprising an electronics unit for providing electronic signals and control comprising a utility controller, a sampler controller, and a timing controller such that the timing controller provides a pulser trigger and the sampler controller provides a sampler trigger; a microwave unit comprising all the microwave components within the system including a pulser for generating pulses as directed by the timing controller in the electronics unit, a transmitting antenna for receiving the pulses directly from and being in close proximity to the pulser, a receiving antenna for accepting the pulses emitted from the transmitting antenna, and a receiver in close proximity to and for accepting the pulses from the receiving antenna, and a data unit for receiving signals from the electronics unit and for displaying the data for review and analysis. In accordance with another embodiment of the present invention, a method is provided for determining the characteristics of a medium. Also provided in the present invention is a pulser which utilizes all microwave components and a novel antenna assembly.

10 Claims, 29 Drawing Sheets

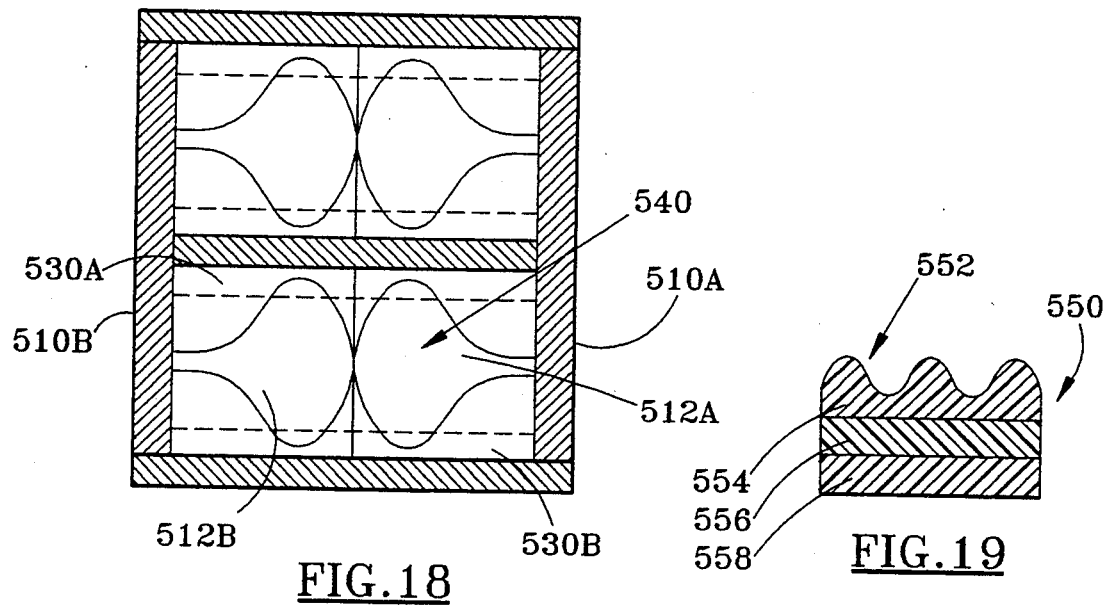
FIG.18
FIG.19
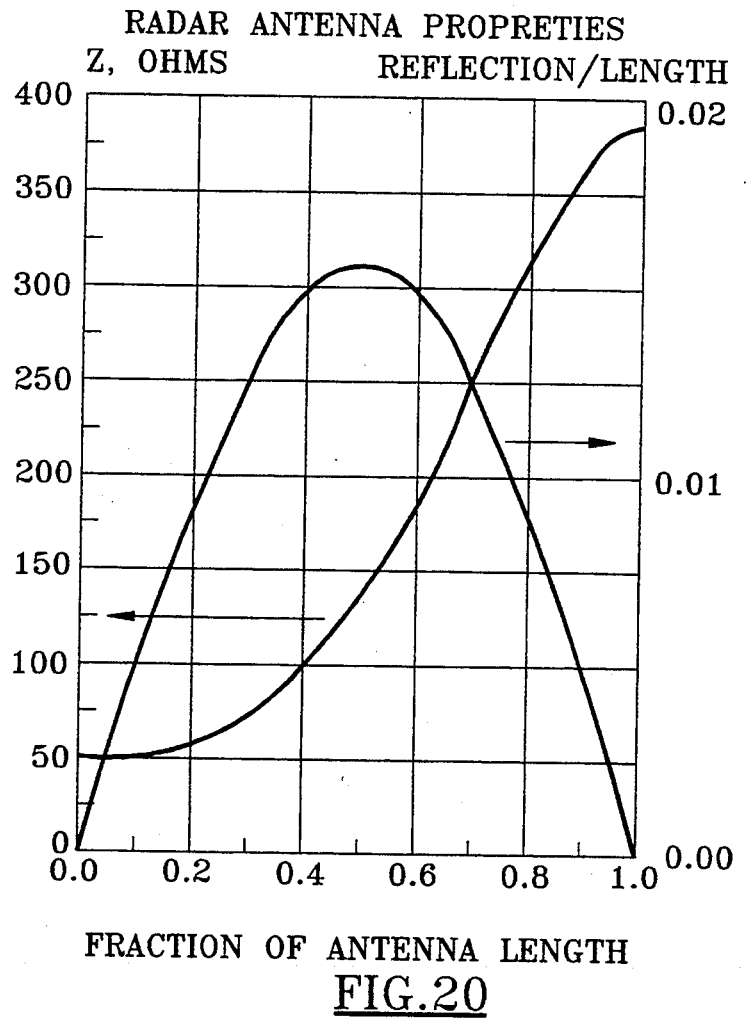
FIG.20

SYSTEM FOR EVALUATING THE INNER MEDIUM CHARACTERISTICS OF NON-METALLIC MATERIALS

FIELD OF THE INVENTION

The present invention relates generally to a pulse radar system and method for determining the characteristics of a subsurface medium, for example, thickness of the mediums, voids and deterioration in a medium, and more particularly to a system and method for evaluating interfaces within a non-metallic medium.

BACKGROUND OF THE INVENTION

In the past, electromagnetic radiation has been used for the detection and identification of objects buried in the ground. Early uses of various types of radiation for detecting subsurface phenomena are quite varied.

Seismic studies have used sound. Sound travels at different speeds in different mediums. The time of travel of sound has been used to determine subsurface characteristics. For example, a series of vibration or sound detecting sensors can be strategically located on the surface below which the characteristics are to be determined. A solid plate can be placed in the vicinity of the sensors. The plate can be impacted to transfer energy into the subsurface medium. The reflection of the energy by different subsurface material causes the sensors on the surface to receive reflected signals at different times. The time differences received by the surface sensors are analyzed to determine the characteristics of the subsurface medium.

The military has detected mines by propagating radiation into the earth and analyzing the reflected radiation. Also, identification schemes have been devised to try to determine the characteristics of buried objects. Object identification systems use empirical data to evaluate the subsurface object. Systems have been devised for determining the location, size and configuration of subsurface objects. However, there are typically many constraints placed on the type of subsurface objects that can be detected. For example, the subsurface object may need to be metal.

Most prior technology is directed to detecting a solid foreign body embedded in another medium. The present system and method seeks to determine information about the characteristics of the medium itself as well as characteristics of the foreign body or void in the other medium.

Typical systems and methods are inappropriate in specific situations for determining many of the conditions within a medium. Delamination in a subsurface medium is a problem which is not easily detected using currently available technology. Delamination occurs when layers composed of two different substances separate. Since the layers remain abutting, it is extremely difficult to detect the separation. Debonding is another phenomenon that occurs within a medium which is difficult to detect using current technology. Debonding occurs when a single, monolithic layer separates to form two layers. Debonding can be extremely difficult to detect. Also, stripping has proved to be an extremely difficult phenomenon to detect. Typically, stripping is associated with asphalt roads. Stripping is the breaking of the adhesive bond between the aggregate surface and the asphalt cement. Usually, stripping begins at the bottom of the asphalt layer and moves upward until the pavement structure is weakened. Cracks appear in the pavement and, in advanced stages, the pavement begins to disintegrate. Each of the phenomenon discussed above, i.e., delamination, debonding and stripping, are extremely difficult or impossible to determine using present technology.

The term ground-penetrating radar represents a wide range of applications and types of radio detection and ranging (RADAR) equipment. Ground-penetrating radar equipment varies from ground coupled to air coupled systems with frequency ranges from 10's of megahertz to 3–4000 megahertz. Applications for the technology generally exit in the shallow geophysical industry, pavement and civil structures area, and in utility location.

A radar unit is a device that emits a pulse of electromagnetic energy and is able to determine the presence or absence of a target by examining the reflected energy from that pulse. Preferably, the pulse is short. By way of example, if a pulse is fired into a pavement structure, the electromagnetic wave travels until it meets with a dielectric discontinuity. The dielectric discontinuity may be caused by many things, for example, a change in pavement layer, moisture within or beneath the layer, an air void, or some other change in the dielectric constant of the material in the path of the wave. A portion of the wave is reflected by this discontinuity and a portion continues to travel through the second medium.

The amount of energy reflected at the discontinuity is a function of the wave impedance of the two materials. At the interface between materials with similar dielectric properties, such as two lifts of an asphalt concrete pavement, most of the energy passes through the interface and very little is reflected back to the transmitter. Conversely, where the difference in dielectrics is significant, such as in an asphalt layer over concrete or a structural layer over base course, more of the energy is reflected to the transmitter.

This reflection phenomenon is the theoretical basis for the production of various radar signatures produced by different subsurface anomalies.

The ability of short-pulse ground-penetrating radar ("GPR") to detect, locate, and characterize subsurface anomalies is well established and well documented. Previous research has shown that GPR is an effective tool for locating voids, identifying stripping in asphalt layers, determining the presence of moisture (at various levels in the pavement structure), identifying areas of delamination in overlays, and providing useful information on other areas of subsurface problems and discontinuities and thickness of individual layers.

Ground-penetrating radar has been used for determining soil interfaces, bedrock profiling, detecting soil water movement, depth of permafrost, evaluation of fractures, thickness of peat and ice evaluation of dam safety and in coal mining. Such deep investigations (40–160') usually involve the use of lower frequency systems than the present invention. In the 6–30' range, mid-range frequency radars are used to locate underground storage tanks, pipelines (water, sewage, gas electrical, etc.), buried drums, archeological applications, and sinkholes. High frequency ground-penetrating radar has been used by the military to determine the location of plastic mines and other unexploded munitions.

It is important to understand the basic radar reflection phenomenon, the relationship between the radar timing and the depth within the media, as well as the effect of anomaly thickness and anomaly location.

A simplified model of the interaction of impinging electromagnetic waves with a dielectric discontinuity can be readily expressed. A portion of the incident electromagnetic wave may be reflected by this discontinuity and a portion continues to propagate down into a second medium. The proportion of the incident wave that is reflected at the interface is determined by the reflection coefficient, P, associated with the boundary. This reflection coefficient is given by:

$$P = \frac{n_2 - n_1}{n_2 + n_1} \quad \text{(Equation 1)}$$

where $n_1$ and $n_2$ are the wave impedance of medium 1 and 2, respectively. In general, the wave impedance is a complex number, but simplification is possible for certain groups of materials. For example, the wave impedance for a highly conductive material such as silver or copper is essentially zero, whereas that for a non-ferrous, non-conducting material such as dry concrete or soil is given by:

$$n = \sqrt{\frac{\mu_0}{\epsilon_0 \epsilon_r}} \quad \text{(Equation 2)}$$

where $\mu_0$ is the permeability of free space (a constant), $\epsilon_0$ is the permittivity of free space (a constant), and $\epsilon_r$ is the relative dielectric constant of the material in question. Since $\epsilon_r$ is the only variable in the wave impedance expression in Equation 2, the reflection coefficient expression shown in Equation 1 can be reduced as follows for interfaces between nonferrous, nonconducting materials:

$$P = \frac{\left[\frac{\mu_0}{\epsilon_0 \epsilon_{r2}}\right]^{\frac{1}{2}} - \left[\frac{\mu_0}{\epsilon_0 \epsilon_{r1}}\right]^{\frac{1}{2}}}{\left[\frac{\mu_0}{\epsilon_0 \epsilon_{r2}}\right]^{\frac{1}{2}} + \left[\frac{\mu_0}{\epsilon_0 \epsilon_{r1}}\right]^{\frac{1}{2}}} = \frac{\epsilon_{r1}^{\frac{1}{2}} - \epsilon_{r2}^{\frac{1}{2}}}{\epsilon_{r1}^{\frac{1}{2}} + \epsilon_{r2}^{\frac{1}{2}}} \quad \text{(Equation 3)}$$

where $\epsilon_{r1}$ and $\epsilon_{r2}$ are the relative dielectric constants for media 1 and 2, respectively.

Note from Equation 3 that if medium 1 has a smaller relative dielectric constant than medium 2, P has a negative value. On the other hand, if medium 1 has a larger relative dielectric constant than medium 2, P is positive. Furthermore, the magnitude of P is proportional to the difference between $\sqrt{\epsilon_{r1}}$ and $\sqrt{\epsilon_{r2}}$. Thus, at an interface between materials with similar dielectric properties, most of the impinging wave energy passes through the interface and little is reflected back toward the transmitting source. On the other hand, a large reflection and a correspondingly small transmission occur at an interface between two materials with greatly different relative dielectric constants. This reflection phenomenon is the theoretical basis for the production of specific "signatures" by various subsurface objects and features.

Table 1 lists approximate $\epsilon_r$ values for selected materials. Table 1 is intended as illustration only because many of the listed materials, $\epsilon_r$ can vary significantly from the listed typical value(s), depending upon a number of factors. Note that $\epsilon_r$ is always greater than or equal to 1. In general, it is safe to assume that virtually all materials encountered in a typical ground-penetrating survey application will have relative dielectric constants which lie between 1 and 81.

TABLE 1

| TYPICAL RELATIVE DIELECTRIC CONSTANTS FOR SELECTED MATERIALS | |
|---|---|
| MATERIAL | $\epsilon_r$ |
| Air | 1 |
| Pure Water | 81 |
| Seawater | 81 |
| Freshwater ice | 4 |
| Seawater ice | 6 |
| Snow (firm) | 1.4 |
| Sand (dry) | 5 |
| Sand (saturated) | 30 |
| Clay (saturated) | 10 |
| Granite (dry) | 5 |
| Granite (wet) | 7 |
| Limestone (dry) | 7 |
| Limestone (wet) | 8 |
| Shale (wet) | 7 |
| Sandstone (wet) | 6 |
| Soil | |
| sandy dry | 2–4 |
| sandy wet | 20–25 |
| loamy dry | 2–6 |
| loamy wet | 15–20 |
| clay dry | 2–6 |
| clay wet | 10–20 |
| Permafrost | 6–13 |
| Strong concrete | |
| dry | 5–9 |
| soaked 20 hrs | 10–15 |
| Cracked concrete | |
| dry | 4–5 |
| soaked 20 hrs | 13–20 |
| Asphalt | 12–16 |

In addition, the depth of a discontinuity below the surface can also be determined from the relative timing of the received reflection. The relationship between the depth of a discontinuity and the timing of the reflected signal can be described. The electromagnetic wave travels from an antenna (transmitting mode) to the interface and back to the antenna (receiving mode) in a time t. The total distance traveled by the wave in this time is 2d. Furthermore, from electromagnetic wave theory, one can determine that provided a material #1 is electromagnetically linear, homogeneous, isotropic, and nonmagnetic; the speed by which the wave propagates, $u_p$, in the material is given by:

$$\frac{c}{\sqrt{\epsilon_r}}.$$

where c=the speed of light in free space (c=3×10$^8$ m/sec) and $\epsilon_r$=the relative dielectric constant of material #1. The speed is given by the total distance traveled divided by the time required to traverse the distance, thus the equality:

$$\frac{c}{\sqrt{\epsilon_r}} = \frac{2d}{t}$$

Solving the equality for the depth, d, at which the interface occurs yields the expression:

$$d = \frac{tc}{2\sqrt{\epsilon_r}}. \quad \text{(Equation 4)}$$

There are devices that provide some information about the conditions within a medium. Most of these devices require that the radiation emitting device be in contact with, or in very close proximity to, the surface under which the measurements are to be taken. Devices that require a direct contact with the surface under investigation greatly inhibit the accuracy of the data and the speed with which the data can be acquired. For example, the requirement that the device be in direct contact with, or in very close proximity to, the surface causes structural wear on the device and limits the types of terrain or surface over which the device can be used and inhibits the rate at which the data can be taken.

There is, thus, a need for an medium measurement system and method which provides information about the conditions within a medium without the mechanical and logistical restrictions of currently available devices, which, at the same time, provides nondestructive measurements of the medium in question, and which provides measurements without directly contacting the medium under investigation.

Recognizing the need for an improved system and method for the measurement of medium characteristics, it is, therefore, a general feature of the present invention to provide a novel system and method for making measurements within a medium, which is nondestructive to the medium, and which operates without direct contact with the medium under investigation.

It is therefore a feature of the present invention to provide a medium measurement system and method for efficiently detecting the thickness of a medium or the thickness of multiple mediums.

Similarly, it is a feature of the present invention to provide a medium measurement system and method for efficiently detecting voids, locating voids and determining the size of voids in a medium.

It is a primary feature of the present invention to provide an apparatus for determining subsurface medium characteristics having an integrated, monocoque microwave unit which contains all the microwave components within a rigid structure wherein the structural integrity is in the microwave unit itself rather than a frame, support or the like.

Also, it is a feature of the present invention to provide an integrated, monocoque microwave unit which requires no connection or disconnection of microwave components, cables or parts such that clutter is maintained at a minimum.

It is also primary feature of the present invention to provide an apparatus for determining subsurface medium characteristics having an integrated, monocoque microwave unit which includes a monocycle pulse generator that uses at least one planar waveguide structure for generating a monocycle pulse.

It is a feature of the present invention to provide an apparatus for determining defects associated with non-metallic materials.

Also, it is a feature of the present invention to provide an apparatus for evaluating bulk material.

Still further it is feature of the present invention to evaluate fiber glass.

Yet still further it is a feature of the present invention to evaluate concrete and asphalt-type material.

It is another feature of the present invention to provide a medium measurement system and method for determining the delamination of two different layers within a medium.

Yet another feature of the present invention is to provide a medium measurement system and method for detecting the debonding of a single, monolithic layer within the medium.

Still another feature of the present invention is to provide a medium measurement system and method for determining stripping within an asphalt medium so that the breaking of the adhesive bond between the aggregate surface and the asphalt cement can be detected and the asphalt can be readily repaired.

Yet still another feature of the present invention is to provide a medium measurement system and method for determining the thickness of one or more layers within a medium.

Further, a feature of the present invention is to provide a medium measurement system that is extremely mobile. The present invention provides for ruggedized equipment that can be mounted on and transported by a vehicle for readily determining the medium conditions in the vicinity of the vehicle.

Another feature of the present invention is to provide a medium measurement system and method which continuously determines a plurality of simultaneous measurement paths for the accurate detection, location and sizing of voids, of delamination, of debonding, of stripping, and of the various layers of the medium.

In association with the noted features of the present invention examples may be roof evaluation, road evaluation, the evaluation of non-metallic solids, bridge deck evaluations, storm sewer evaluations, subway tunnel evaluations, aqueduct tunnel evaluations, and layered fiber glass material evaluations.

Additional objects and advantages of the invention will be set forth in part in the description which follows, and in part will become apparent from the description, or may be learned by practice of the invention. The features, objects and advantages of the invention may be realized and obtained by means of the instrumentalities, combinations and steps particularly pointed out in the appended claims.

SUMMARY OF THE INVENTION

To achieve the foregoing features, objects and advantages, and in accordance with the purposes of the invention as embodied and broadly described herein, a medium measurement system is provided for the nondestructive determination of the condition of a medium which comprises one or more transducers, one or more antenna with the associated transducer juxtaposed to the respective antenna, means for recording the measurements, a system control unit for operatively coordinating the transducers, the antenna and the means for recording, and a power unit for energizing the system.

In a preferred embodiment, a pulse radar system for determining the subsurface structure of a non-metallic medium using a reflected signal representative of the subsurface structure is provided having a controller and an integrated, monocoque microwave unit for incorporating all the microwave components associated with the pulse radar system such that all the components are in close microwave communication one with the other and all communication of microwaves between components is maintained in and restricted to the integrated microwave unit. The controller generates and receives electronic signals including the transmission of a pulser trigger signal and a sampler trigger signal and the reception of the reflected signal.

The integrated microwave unit comprises at least one antenna unit, a plurality of spacers of low dielectric material for securedly fixing the antenna units in positional relationship, a base of low dielectric material for rigidly securing the antenna units in positional relationship for forming a monocoque structure, a plurality of covers of low dielectric material for protecting the antenna unit, an enclosure in the antenna unit, a pulser integral with the microwave unit and located in the enclosure for receiving the pulser trigger signal from the controller and for generating microwave pulses, the pulser for providing microwave pulses to the antenna unit, and a sampler integral with the microwave unit and located in the enclosure for receiving the reflected signal from the antenna unit.

The antenna unit comprises at least one former of low dielectric material having a generally triangular shape with an apex at one end, a bottom at the other end and legs extending there between and having two substantially parallel sides such that as the legs extend from the apex to the base splayed surfaces are formed between the sides. As the splayed surfaces approach the bottom, the splayed surfaces are flared for expanding at a rate greater than the splayed portion of the surfaces near the apex. A first and second support member of low dielectric material each support member having a planar configuration for engaging the splayed and flared surfaces of the former such that the support members are shaped to conform to the splayed-flared surface configuration. A first and second antenna leaf are operationally engaged with the first and second support members, respectively, for operating in the transverse electromagnetic (TEM) mode. A plurality of spacers of low dielectric material are engaged with the sides of the formers for securing the antenna units in positional relationship. A base of low dielectric material engages with the bottoms of the formers and the spacers for rigidly securing the antenna units in positional relationship for forming the monocoque structure comprising the antenna unit, the spacers and the base. A plurality of covers of low dielectric material engage the base and the spacers for protecting the antenna leafs and support members. A pulser integral with the microwave unit and located in the enclosure receives the pulser trigger signal from the controller. The pulser provides microwave pulses to the antenna unit. A sampler integral with the microwave unit is located in the enclosure for receiving the reflected signal from the antenna unit.

In another embodiment a pulse radar system for determining the subsurface structure of a non-metallic medium is provided including a data unit for receiving signals from the controller and for analyzing, generating and displaying data. Also, a high absorption, low reflectivity material can be provided to surround the antenna unit.

More particularly, the antenna unit comprises an air-coupled, horn, antenna in close proximity to the pulser for operating in the transverse electromagnetic (TEM) mode sufficient for transmitting a non-dispersed, broadband of frequencies ranging from approximately 100 MHz to above 2.0 GHz. Also, the low dielectric material can be Polystyrene ® or Styrofoam ®.

Further, the pulser comprises a first microwave transmission line for replicating a positive-going microwave pulse, and a second microwave transmission line for replicating a negative-going pulse. The positive-going microwave pulse and the negative-going microwave pulse are precisely fitted together to form a monocycle microwave pulse. At least one of the microwave transmission lines are a planar waveguide structure. The planar waveguide structure can be a coplanar waveguide structure or microstrip waveguide structure.

Further, the controller can be housed in the enclosure of the integrated, monocoque microwave unit.

BRIEF DESCRIPTION OF THE DRAWINGS

The accompanying drawings, which are incorporated in and constitute a part of the specification, illustrate the preferred embodiments of the invention and, together with the general description of the invention given above and the detailed description of the preferred embodiments given below, serve to explain the principles of the invention.

FIG. 18 is a end view of the embodiment of the flared-leaf antenna configuration illustrated in FIG. 17 along the section line 18—18;

FIG. 19 is an illustration of a cross-section of the high absorption, low reflectivity material used in practicing the present invention;

FIG. 20 is a plot illustrating the impedance as a function of the distance from the feedpoint;

The above general description and the following detailed description are merely illustrative of the generic invention, and additional modes, advantages, and particulars of this invention will be readily suggested to those skilled in the art without departing from the spirit and scope of the invention.

PREFERRED EMBODIMENT OF THE INVENTION

The preferred hardware configurations used in the present short-pulse radar system using a separate antenna for transmitting and receiving. The timing, signal processing, receiver, transmitter and power supply component configuration is also critical in practicing the present invention. The timing and signal processing functions are performed by the radar control subsystem. The receiver and transmitter are mounted in the antenna assemblies. All signal and power transmission between the antenna assemblies and the radar control subsystem are routed through cables. The interaction of the radar receivers and transmitters is critical as discussed below.

The present invention provides an instrument for the evaluation of characteristics of non-metallic objects. The evaluation of characteristics of non-metallic objects is effectuated by the use of short pulse radar. Generally, short pulse radar has the characteristic that the width of the transmitted pulse is between 0.1 and 10 nanoseconds.

Figure 1:
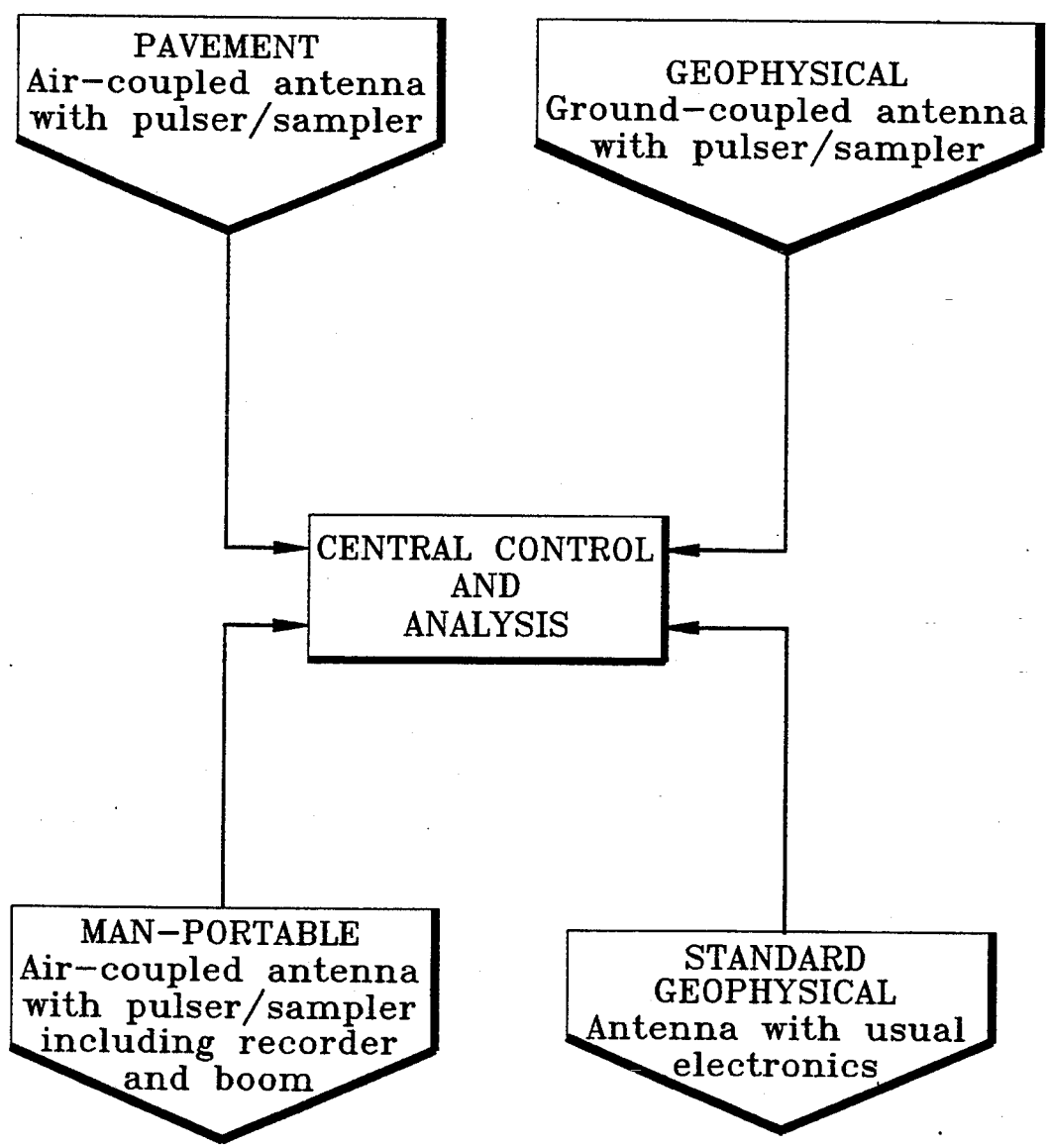
FIG. 1 illustrates several general embodiments of the pulse radar system of the present invention.

FIG. 1 is a schematic diagram illustrating the basic concept of the present invention. A central control and analysis unit is provided for multiple and varied uses. The central control unit can be connected to a pavement inspection device, a ground coupled radar apparatus, a man-portable apparatus and a geophysical apparatus. The pavement apparatus would include an antenna in conjunction with a pulser and sampler. The ground coupled radar unit would include a bow tie or other antenna in close connection with a pulser and sampler. The man-portable apparatus would include an antenna in close connection with a pulser/sampler, recorder and possible a boom. The geophysical apparatus would include an antenna with a state of the art geophysical unit. All of the units, the pavement apparatus, the ground-coupled radar apparatus, the man-portable apparatus and the geophysical apparatus would be connected to the same central control and analysis unit.

The central control and analysis unit would comprise a computer and software, an analog to digital converter, a DAT tape drive, a power supply, a soil lock device and a radar data analysis system.

Continuous radar data can be collected covering an approximate 12-inch wide path for the entire length of the pavement. The antenna may be placed at any position relative to the pavement. Data can be collected at various speeds of, for example, 1-10 MPH. The time from the firing of the pulse to its return to the antenna is very accurately timed. This travel time is a function of the thickness of each layer and a material property known as the dielectric constant. The dielectric constant is a measure of the ability of the material to pass electromagnetic radiation through it.

The data can be acquired utilizing a short-pulse radar with a center frequency of one gigahertz. Position is determined by a transmission mounted distance measuring device. The data is digitally stored in a computer for processing. The processing software displays the data in color on a monitor for the analyst to review. Changes in the color horizons indicate a change in pavement structure. The location of this change in structure is noted and saved for later tabulation. Thickness of each layer can be determined by the expression:

$$\text{Layer thickness} = \frac{6t_n}{\sqrt{E_n}}$$

where
- $t_n$ is the 2-way travel time (in nanoseconds) of the pulse in layer n, and
- $E_n$ is the dielectric constant of layer n.

In determining the remaining life and quality of previous construction of in-service pavement, an analyst should have information about the subsurface characteristics of the pavement. Historically, this information was obtained by taking as many pavement cores as budget would allow and inferring the overall condition of the subsurface from the results of the coring operation.

In the pavement industry alone, the present invention provides a non-destructive diagnostic tool of non-contact ground penetrating radar. The benefits of using the present invention over traditional methods in the pavement industry include (1) minimizing traffic disruption and exposure of work force to traffic hazards; (2) providing a more detailed "picture" of subsurface conditions; (3) rapid and cost-effective analysis of subsurface conditions; and (4) providing a database to verify performance predications and verify strategic effectiveness of rehabilitation techniques through long-term monitoring.

The present invention may also be applied to the investigation of tunnels, bridge decks, and all other non-metallic structures.

The typical application has been to investigate pavement structures to measure pavement thickness, identify thin or weakened areas, locate voids beneath the pavement, measure overlay thickness, define areas of stripping, and determine the position of the reinforcing steel. The data collected is used with other measures of conditions as decision criteria in planning a pavement rehabilitation program. At the network level, the ground-penetrating radar of the present invention can be used to rapidly identify vertical structural characteristics and the general subsurface condition of pavement structure, i.e., locate moisture, voids and other deteriorated areas using a small sample to represent the entire area. At the project level, a detailed evaluation of the extent and location of deteriorated (voids, stripped asphalt, wet areas, etc.) can be defined for use in planning the appropriate rehabilitation technique.

The present invention can be used to investigate state and local highways, airports and parking facilities. The scope of such uses ranges from single pass network surveys for planning and budget purposes to detailed multi-pass project level surveys to determine project designs. Users of the present invention might include state highway departments, city and county public works officials, and pavement consultants.

Alternately, the present invention is capable of performing environmental site investigations, utility location, and other near surface searches for buried targets. Typically, civil consulting firms have such needs.

Due to the varying conductivity of the different geology of regional soils, the present invention performs a number of geophysical applications. Such applications include locating bedrock for a pipeline river crossing and determining the extent of moisture pouring from broken pipe. Typically, geo-technical engineering firms and the military have such needs.

FIG. 1 is an illustration of a preferred embodiment of the pulse radar system 100 of the present invention including a vehicle used to transport the invention. Specifically, the electronics unit 200 and the data unit 400 are illustrated inside the vehicle 10. The microwave unit 300 is illustrated removed from the vehicle 10 by the boom 12. The vehicle 10 is used to travel, for example, over a highway or other terrain at a rapid pace and gather subsurface data.

Figure 3:
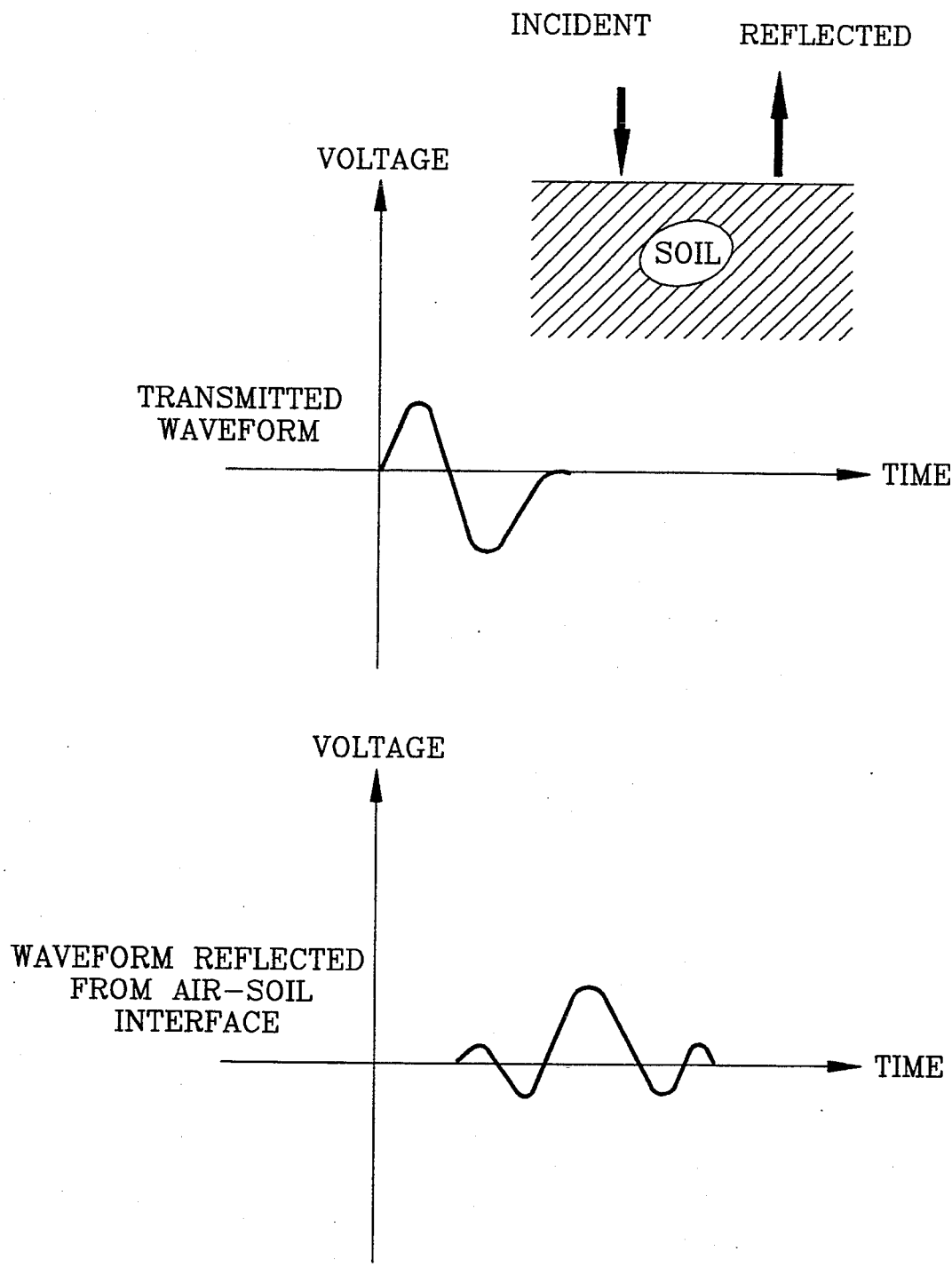
FIG. 3 illustrates the interaction of a short-pulse radar signal as practiced by the present invention with soil when no anomaly is present.

To further explore the signature issue, the actual waveform transmitted by a specific pulse radar. The specific waveform is the "signature" of the particular system. An approximate sketch of the waveform employed by the pulse radar system of the present invention is shown in FIG. 3.

Figure 4:
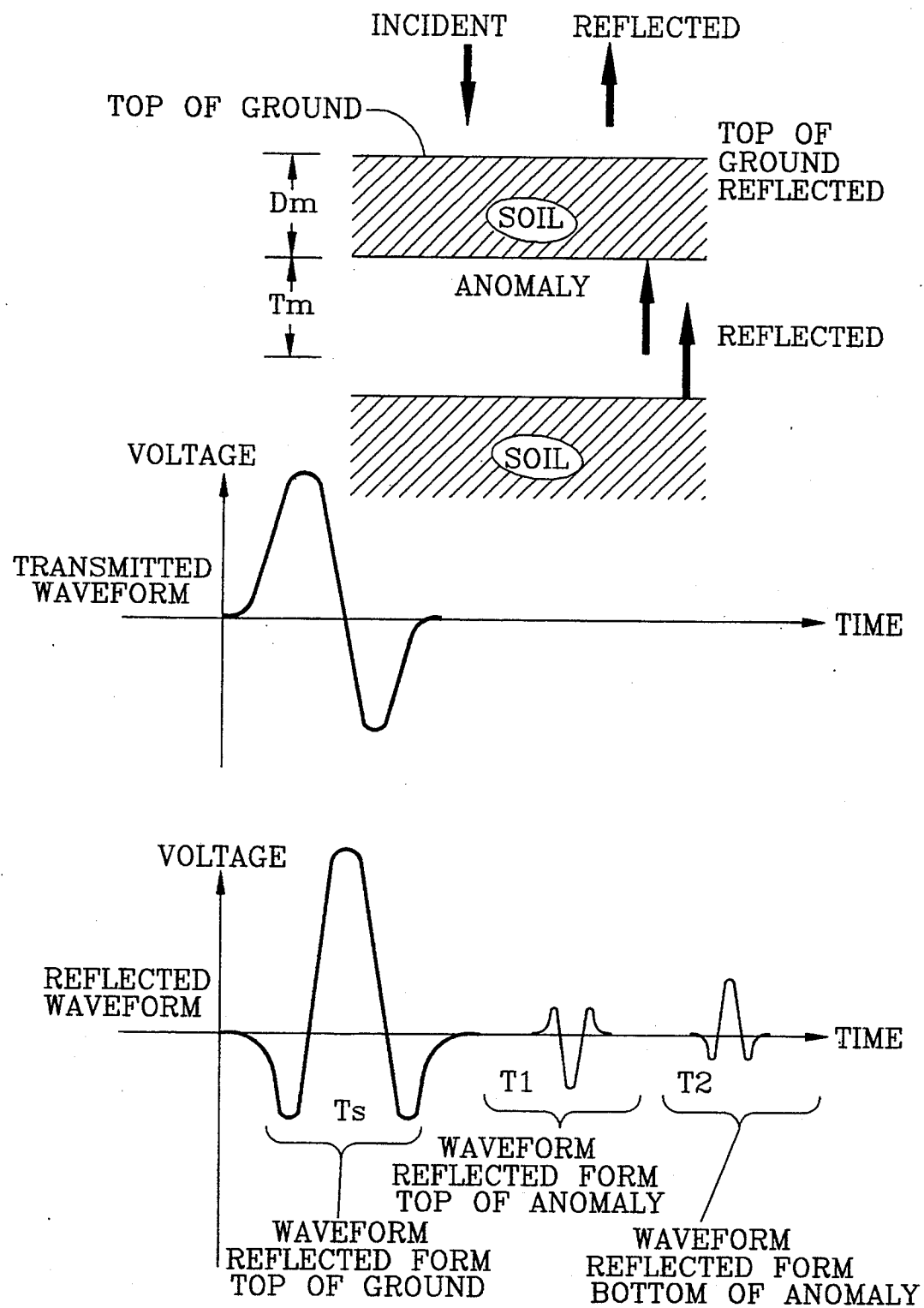
FIG. 4 illustrates the interaction of a short-pulse radar signal as practiced by the present invention with soil and a subsurface, relatively thick, anomaly.
Figure 5:
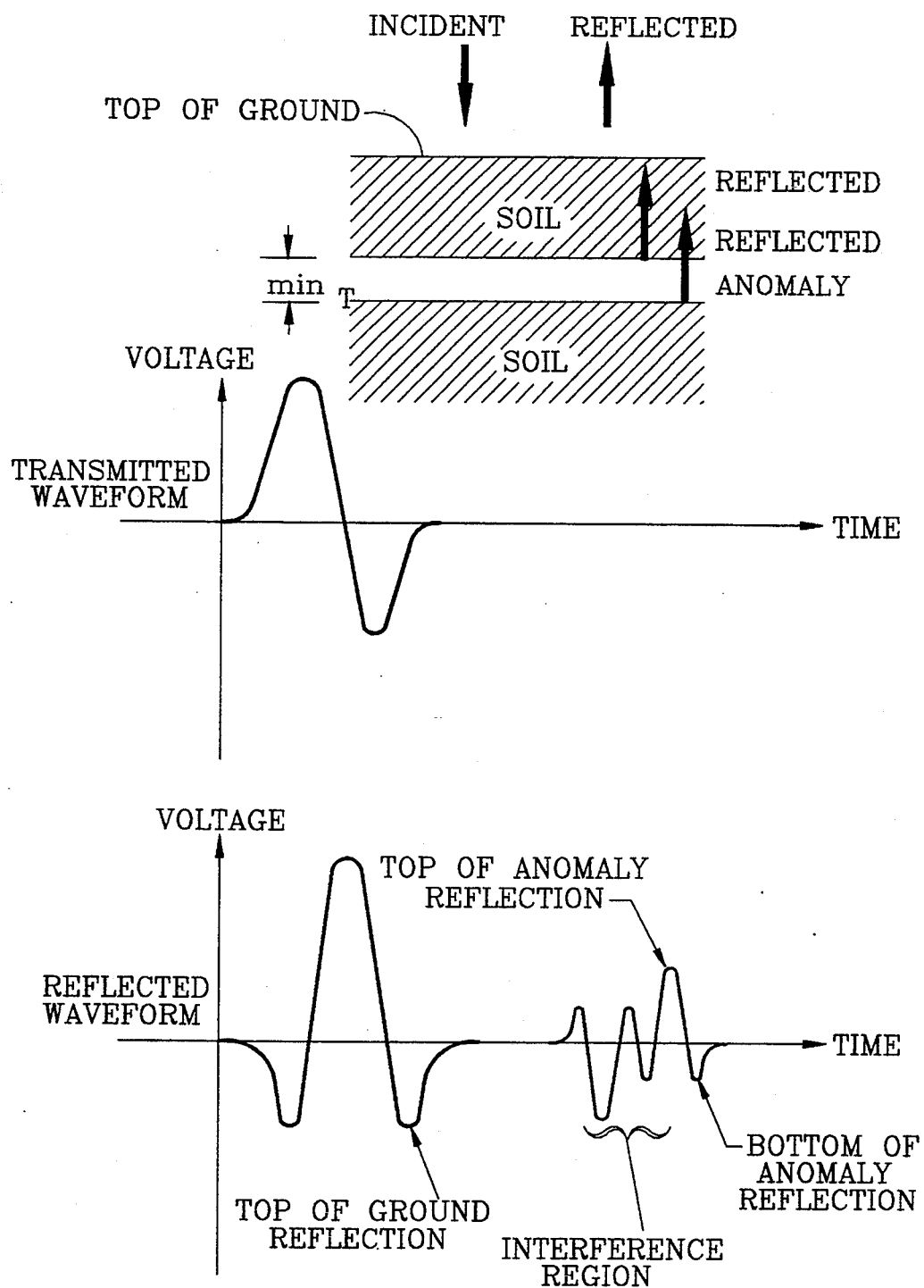
FIG. 5 illustrates the interaction of a short-pulse radar signal as practiced by the present invention with soil and a relatively thin anomaly.
Figure 6:
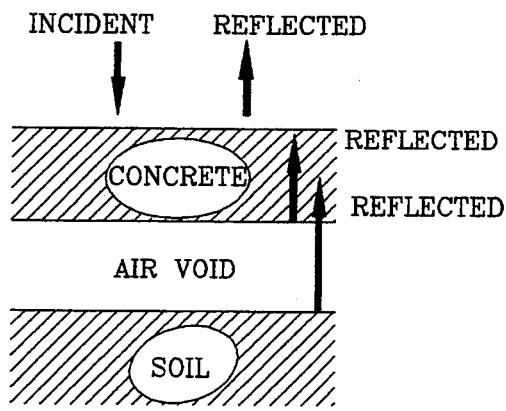
FIG. 6 illustrates a model of a subsurface air void as applicable to the present invention.
Figure 7:
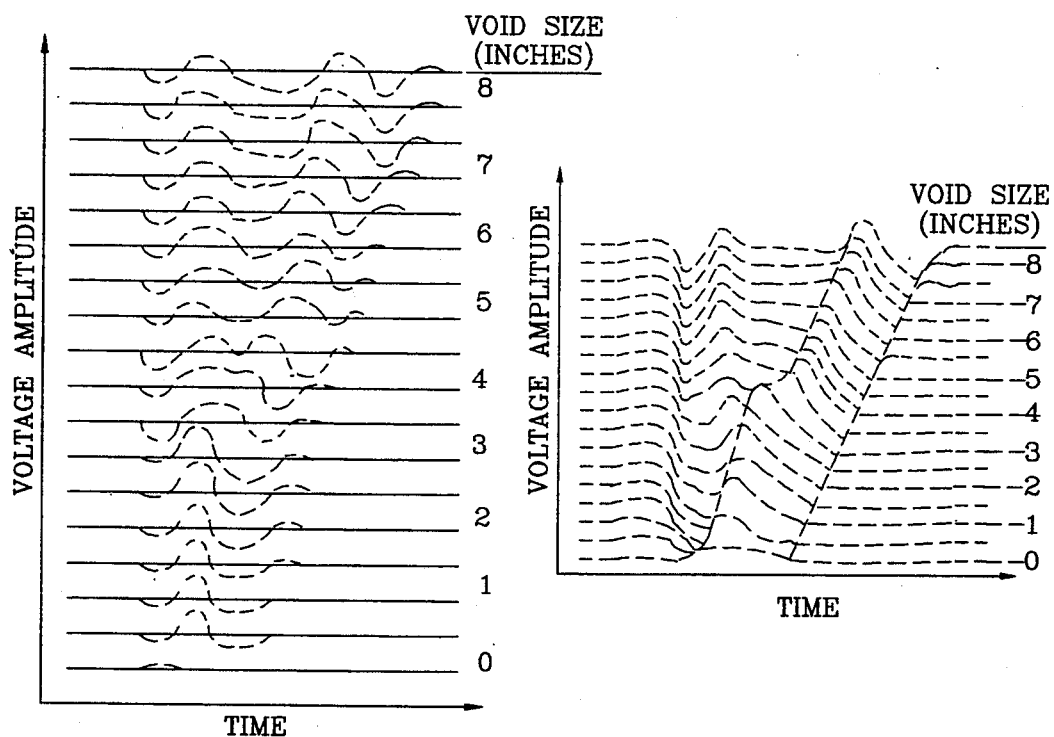
FIG. 7 illustrates the relationship between the wave forms associated with the present invention and void thickness.

FIG. 4 illustrates the idealized interaction of this waveform with five hypothetical material interfaces. Note that for negative reflection coefficients, the transmitted wave is inverted upon reflection from the interface. For cases in which the two relative dielectric constants are very dissimilar, this attenuation is relatively slight. At the other extreme, no reflection occurs at an interface between materials with identical dielectric constants.

Figure 8:
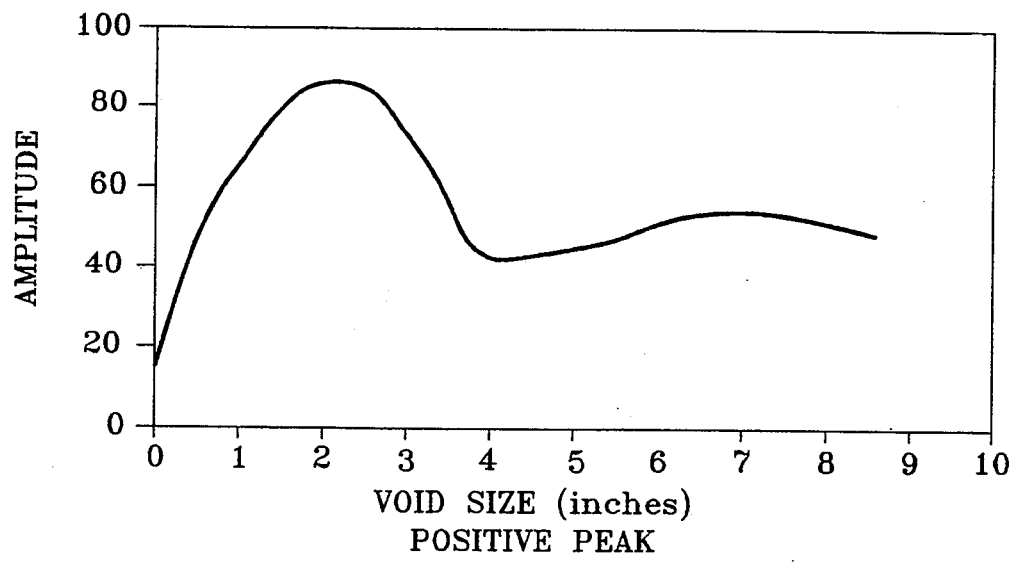
FIG. 8 illustrates the relationship between positive peak amplitude and void thickness when practicing the present invention.
Figure 9:
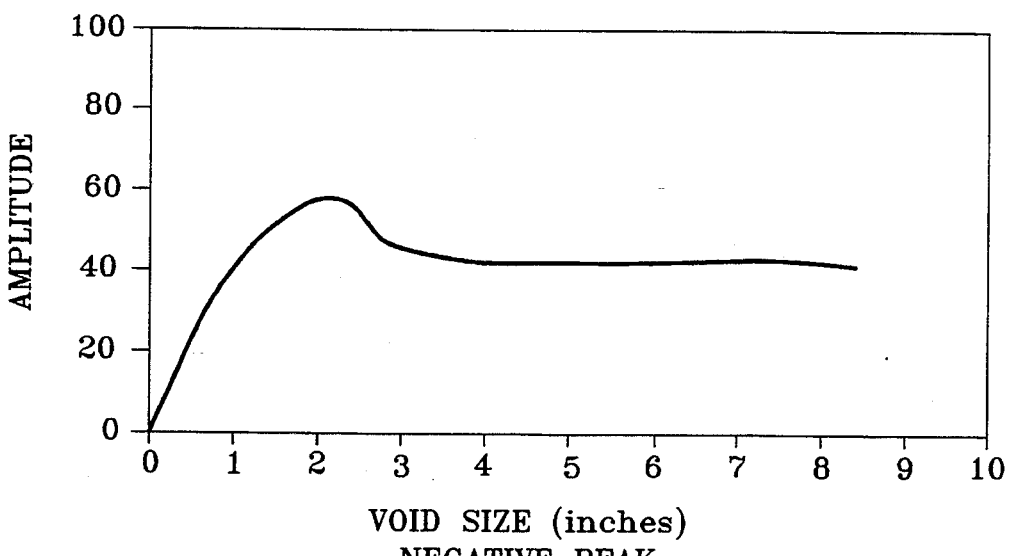
FIG. 9 illustrates the relationship between negative peak amplitude and void thickness when practicing the present invention.

The short-pulse radar system uses an equivalent time sampling technique. Direct sampling techniques require sampling the desired signal at the Nyquist rate during each period. Such a method would be impossible to implement for the short-pulse radar system due to the high repetition rates and the high frequency content of the radiated monocycle pulse. The sampling method used in each short-pulse radar is equivalent time sampling. This technique is used in very high frequency oscilloscopes whereby a very fast signal is converted to a lower frequency replica. The short-pulse radar system timing module derives a 50 Hz scan frequency from the 5 MHz PRF. It is during this scan period that the high frequency waveform is reconstructed. The sampling technique is implemented by taking only one sample of the received waveform every pulse period instead of sampling the received waveform at the Nyquist rate during each period. The sample point is moved slightly each period until the desired real time receiver window is traversed. The movement of the sample point across the receiver window is performed during the scan period. The samples are stored and integrated on a capacitor for thousands of PRF periods until the desired waveform is reproduced. For example, the short-pulse radar system has a 5 MHz repetition rate, a 20 nanosecond real time receiver window and a 50 Hz scan rate. The scan period for the short-pulse radar system has a 10 percent dead time during which the sample point is not moved. Thus, the sample point is moved 20 nanoseconds in real time during only 13.5 milliseconds of the scan period. Thus 67,500 samples are used to reconstruct the waveform since that is how many periods of the PRF occur in 13.5 milliseconds. This sampling concept is illustrated in FIG. 8.

The short-pulse radar system generates the sampler trigger in the sampler control module. The trigger is generated by using one of the 5 MHz transmitter triggers and sweeping it in time so that it traverses the 20 nanosecond window during the scan period. This sweeping trigger is routed through a monolithic delay line in the sampler control module and then sent out to the radar sampling receiver. The delay line is adjusted so that the 20 nanosecond real time receiver window is in the proper place to observe the desired returns from the radar. The window must include the surface reflection return and all of the desired subsurface target reflections. Using the delay line fixes the position of the radar window in relation to the transmitter.

The sampling receiver is mounted within the microwave unit. The microwave unit ensures that the sampling receiver is as close to the antenna as possible to minimize noise and clutter problems. Preferably, the signal from the antenna is routed to the receiver through a coaxial cable. In an alternate embodiment, the signal can be buffered by a wide band RF amplifier. The output of the amplifier is the actual receiver sample point.

The sampling receiver is of the single diode gate type. The receiver trigger is converted to a narrow impulse that forward biases a Schottky diode gate to allow a sample of the signal at the amplifier output to pass through the gate. This sample modulates the voltage on a storage capacitor. The capacitor not only stores the sample, but it acts as a smoothing low pass filter as well. The capacitor voltage is then buffered by an operational amplifier. The operational amp output represents the receiver output signal which is routed by coaxial cable to a buffer module in the radar control subsystem.

The monocycle transmitter is mounted directly on the antenna enclosure to eliminate noise coupling to sensitive sections of the short-pulse radar system. When the transmitter receives its trigger signal from the timing module, it generates an output pulse that resembles a single cycle of a 1 GHz sine wave as previously discussed. The pulse width is nominally one nanosecond and its amplitude is approximately 20 volts peak to peak into 50 ohms. The transmitter uses a single bipolar transistor biased in the avalanche mode to generate the required rise time and amplitude of the output pulse. The transmitter output for a monostatic configuration travels through a coaxial delay line past a feed through sampler and on to the antenna. Alternately, for a bistatic system, a 50 ohm terminated sampler connected to the receiver antenna would replace the feed through sampler. The delay line serves to keep parasitic internal reflections from appearing in the receiver range window. The transmitter output for the bistatic configuration travels directly to the antenna. The outputs from the sampling receiver is routed to the buffer module. The buffer module uses operational amplifiers to condition the signals with gain and offset. The signal conditioning is designed to maximize the dynamic range of the FM modulators in the telemetry subsystem.

The combined antenna and microwave components improves the clutter level provided by the present invention. Thus, the present invention significantly reduces the noise associated with using the invention. With improved clutter and reduced noise, patterned recognition is greatly enhanced utilizing the configuration of the present invention with the microwave and antenna devices in close proximity. For example, the microwave pulser and sampler are affixed directly to the antenna. The pulser will issue commands to the sampler rather than a sampler-trigger generator as in the prior art.

The DC power supply generates the required voltage for the components in the radar control system as well as the transmitter and receiver. The pulse radar system uses DC to DC switching converters to generate symmetrical 15 volt supplies, a 5 volt supply, and a +150 volt supply from the +12 volts available on the remote sensor platform.

The short-pulse radar system utilizes a fixed receiver range window. The fixed window is positioned in time to examine reflection returns from the surface and all expected subsurface targets. The window is not intended to be field adjustable. However in yet another alternate embodiment, a window adjustment would be possible and desirable. For example, use of the present invention as a deep-penetrating utility-type radar will need a longer time window. For pavement evaluations, all adjustments are made during the initial calibration for each radar and will remain stationary during subsequent field applications. Each window is 20 nanoseconds in real time length, which includes a five nanosecond safety margin for system timing drift. Therefore, assuming a soil dielectric constant of 13, the minimum target depth can be seen by the radar in 24 inches.

Alternatively, the short-pulse radar system could utilized a tracking circuit that has the ability to lock to a reflection return and position it at the beginning of the range window. For example, the tracker can be locked to the surface reflection return so that all desired subsurface targets will be visible in the window. Such a circuit has the advantage that it will correct for system timing drifts to keep the surface reflection stationary in the window.

The short-pulse radar scan rate practiced as part of the present invention represents the time during which the sampling system reconstructs a low frequency replica of the real time received waveform. Several factors influence the selection of the scan rate. The scan rate determines the maximum speed that the radars can move across the ground and still maintain an accurate representation of the subsurface targets. The scan rate also influences the sampling rate of the digitizer used to quantize the radar receiver waveforms. Doubling the scan rate essentially doubles the Nyquist frequency of the receiver signal. Increasing the scan rate without increasing the radar PRF also means that less samples are used to construct the receiver low frequency replica waveform. This will eventually lead to decreased system noise performance.

The scan rate and real time receiver window selected for the short-pulse radar sensor system are 50 Hz and 20 nanoseconds, respectively. These two factors set the bandwidth of the receiver output waveform to about 3.0 KHz. The digitizer is set up to sample at 14 KHz which is 2.3 times the Nyquist rate. This over sampling factor provides for the use of some simple peak detection algorithms for locating the surface return.

Figure 10:
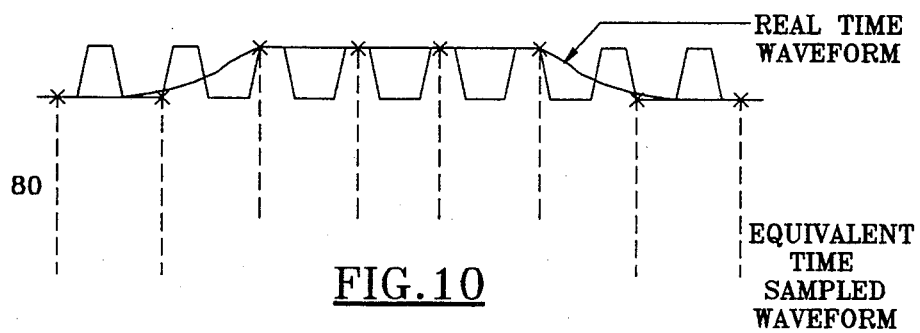
FIG. 10 illustrates one embodiment of time sampling used in practicing the present invention, i.e., equivalent time sampling.
Figure 11:
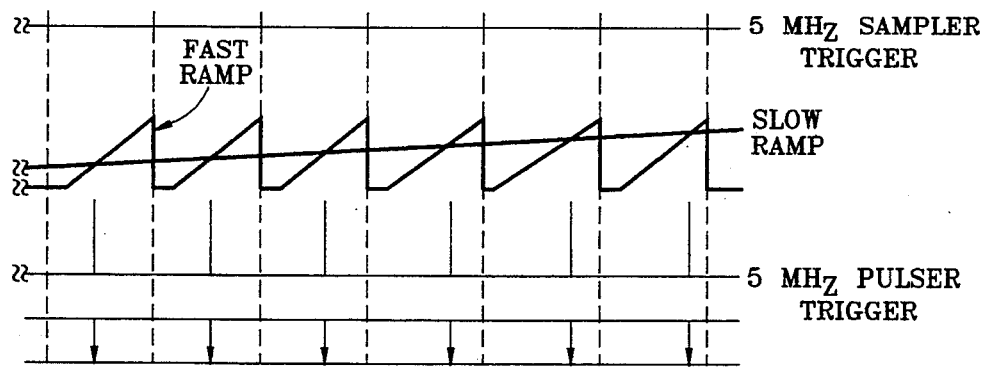
FIG. 11 illustrates typical pulser trigger signal generation and typical sample trigger signal generation from the bistatic antenna arrangement as practiced with the present invention.

FIGS. 10 and 11 illustrate the timing relationship used in the present invention. Specifically, the timing relationship illustrated is the 5 MHz pulser trigger going to the pulser 310 and the 5 MHz sampler trigger going to the sampler 340. In the present invention, the waveforms illustrated in FIG. 11 are generated by the controller 200.

The sampling process as illustrated in FIG. 11 is used because the original signal is far too fast to be analyzed with standard electronic techniques. The controller 200 provides pulses approximately five million times a second. The pulser 310 is pulsed five million times a second by the controller 200. The receiver 340 samples the return signal at one point each time the pulser 310 fires. The continuous point the receiver 340 samples slowly moves in time from the star.of the pulse, in the illustrated case down to approximately 20 nanoseconds after the start of the pulse. Thus, roughly a one nanosecond pulser is created. By slowly moving the sampling point away from the start point of the pulser 310, the sampler 340 terminates after approximately 100,000 pulses. The 100,000 pulses comprises a single trace in achieving the results of a single pulse. Since the pulser 310 is firing five million times a second, then dividing by 100,000, the system of the present invention gets 50 full traces a second.

Figures 2, 2A:
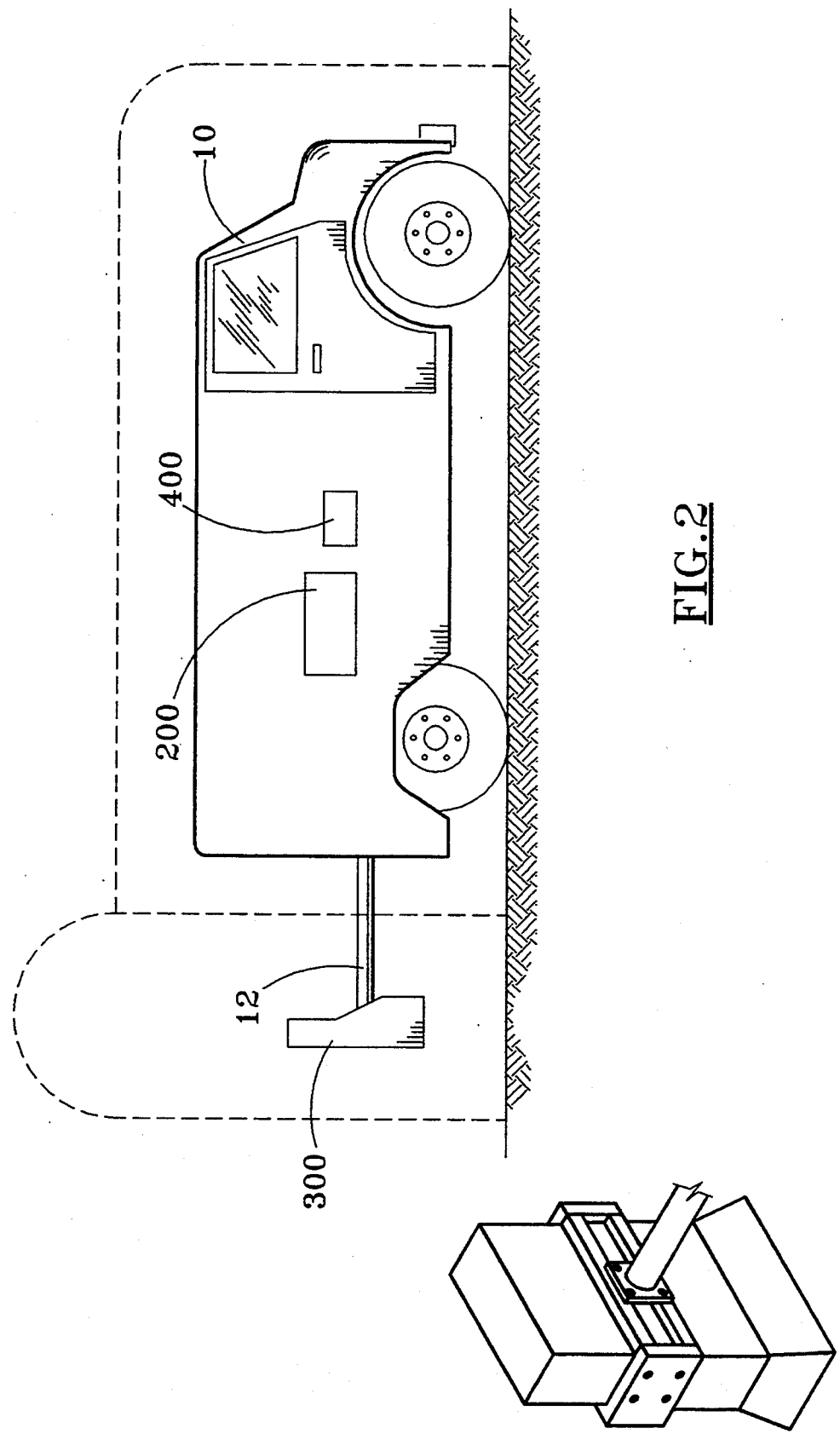
FIG. 2 is an illustration of an embodiment of the pulse radar system of the present invention illustrating the distinct segregation between microwave and electronic components including a vehicle used to transport the present invention.
FIG. 2A is a break-away view of the boom illustrated in FIG. 2.
Figure 14:
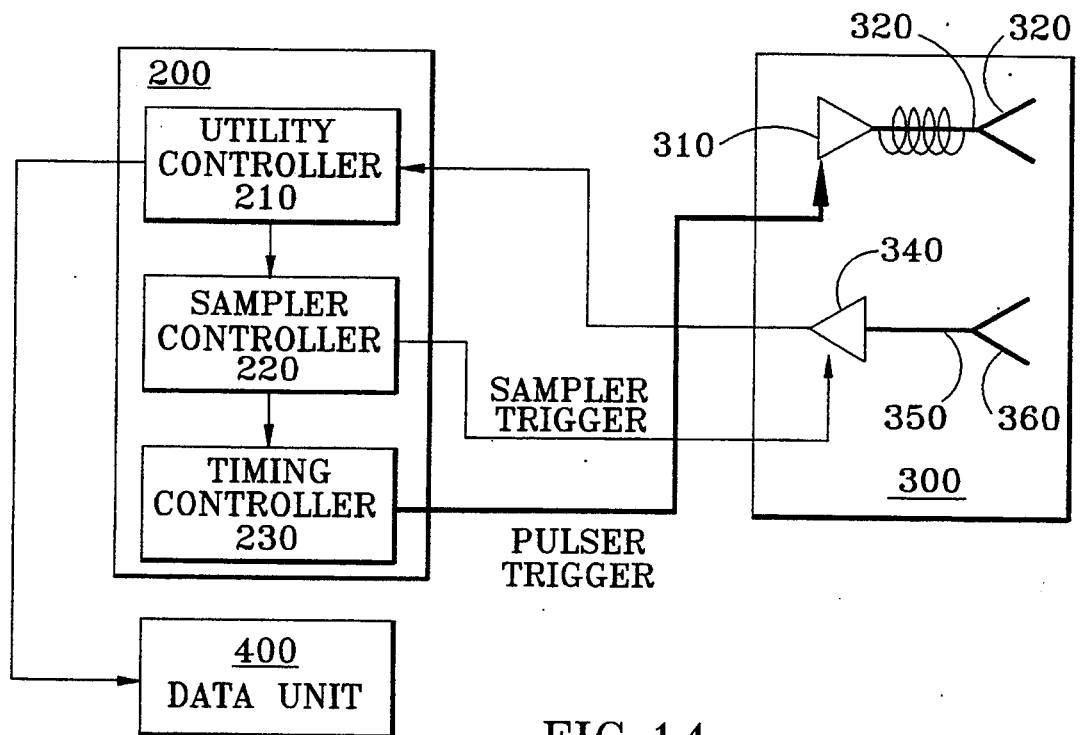
FIG. 14 is a block-schematic diagram illustrating the segregation of the electronics components and the microwave components of the short-pulse radar assembly as utilized in the bistatic embodiment of the present invention.

Typicall, as illustrated in FIGS. 2 and 14, the microwave unit 300 outputs 50 full radar traces a second. The resulting nonmicrowave signal is received by the controller 200. The signal from the controller 200 provides information to the data unit 400. Each cycle is typically recorded by the data unit 400.

The use of the 50 Hz scan rate means that a 10 MPH speed for the remote sensor platform will produce a scan every 2.6 inches of horizontal distance along the ground. The short-pulse radar antennas produce a pattern that illuminates approximately a 12 inch diameter spot on the ground. This factor combined with the selected scan rate implies that targets with dimensions on the order of 3 inches can still be resolved as the short-pulse radar moves across them at a 10 MPH rate.

The short-pulse radar system uses a broadband, non-dispersive horn antennas. The antennas operate in the TEM mode and are designed to handle a pulse that contains frequency energy ranging from less than 100 MHz to above 2.0 GHz. The antenna preserves the pulse shape without pulse stretching or parasitic ringing. These properties permit excellent resolution of subsurface targets.

Figure 12:
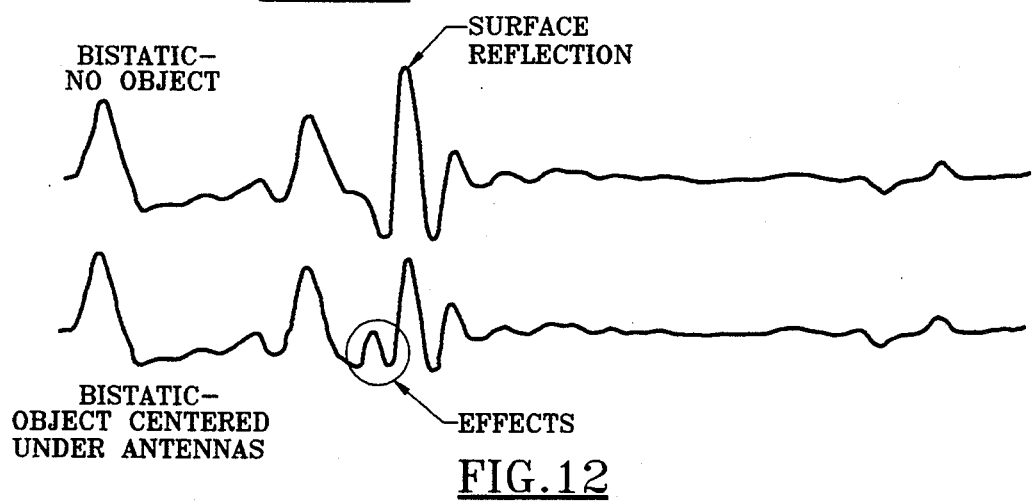
FIG. 12 illustrates two typical signals from the bistatic antenna arrangement of the present invention demonstrating the signal with no object present and an object centered under the antennas.

FIG. 12 shows two receiver output wave forms. The two traces are from a bistatic system. A metallic object was placed directly under the antenna on the surface of the ground. The first trace is the receiver output when the object is removed, and the second trace shows the object in place. Important features of the waveforms are indicated on FIG. 12. It is apparent that the presence of the object when on the surface is easily detected.

It is possible to use the magnitude of the surface reflection to aid in determining the bulk dielectric constant of the soil near the surface. Knowledge of the dielectric constant is necessary to accurately determine the depth of a subsurface target. The amplitude of the surface reflection will vary depending on the soil dielectric properties. In order to accurately quantize the soil properties, the surface return must not be influenced by a parasitic reflection from the antenna itself. Therefore, a bistatic antenna configuration is more useful in this type application.

FIG. 14 illustrates the complete separation of the critical units of the present invention. To practice the present invention, all microwave components are maintained in the microwave unit 300. No microwave signal is transferred from the microwave unit 300 to any other unit or component of the pulse radar system of the present invention. Only microwave devices are contained in the microwave unit 300. Similarly, only electronic devices are contained in the electronics unit 200. No microwave signals are received by or associated with the electronics unit 200. The data unit 400 receives video signals from the electronics unit for processing. In summation, the microwave unit 300 primarily contains a pulser 310 in direct association with a transmitting antenna 330, and a sampler 340 in direct connection with a receiving antenna 360.

The electronics unit 200 is an electronic enclosure containing multiple circuit boards. The electronics unit 200 has no microwave devices in it. It might be noted that power supplies and related devices known to one skilled in the art are not illustrated in the figures. The electronics unit 200 provides all the timing signals for the microwave unit 300. Also, the electronics unit 200 provides video signals and strobe signals to the data unit for analysis and display.

FIG. 14 illustrates the short-pulse bistatic radar system of the present invention showing the primary sub-components: the electronics unit 200, the microwave unit 300 and the data unit 400. The basic components of the electronics unit 200 are the utility controller 210, the sampler controller 220 and the timing controller 230. The timing controller 230 provides the pulser trigger signal for the pulser 310 in the microwave unit 300. Although other frequencies are applicable, the timing controller 230 of the present invention provides a 5 MHz pulse trigger to the pulser 310. The 5 MHz pulser trigger initiates five million pulses from the pulser 310. Likewise, the receiver 340 in the microwave unit 300 receives five million pulses.

It is critical to practice the present invention that the microwave components be maintained separate and distinct from the electronic components. To achieve the unique results of the present invention the microwave components must maintained in the microwave unit 300. Further, it is essential in practicing the present invention to isolate all microwave signals and to reduce to an ultimate minimum reflections, interferences and other inconsistencies in the microwave signals. The microwave unit 300 places the pulser 310 as close as physically possible to, and indeed juxtaposed to, the transmitting antenna 330. Similarly, the sampler 340 is placed as close as physically possible to, and indeed juxtaposed with, the receiving antenna 360. The sampler controller 220 provides the timing for the sampler 340. Particularly, the sampler controller 220 provides the sampler trigger pulse for the sampler 340. The sampler trigger pulse provides that the sampler accurately receives the reflected microwave signal from the receiving antenna 360.

Figure 15:
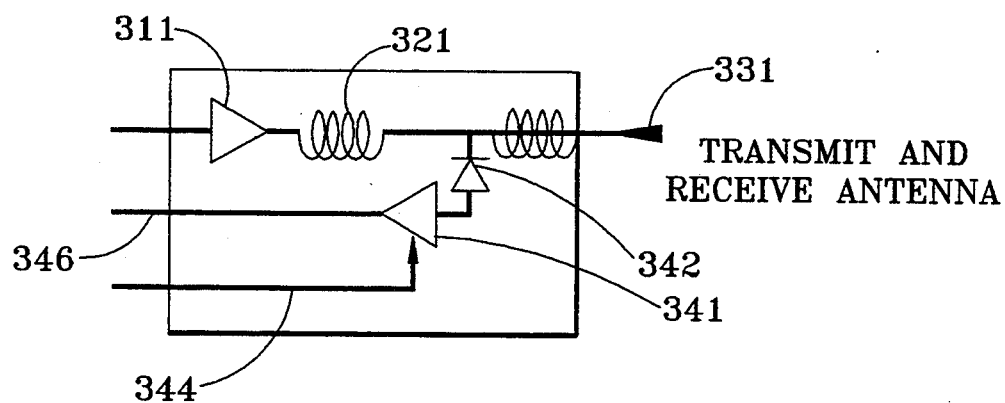
FIG. 15 is a block-schematic diagram illustrating the segregation of the electronics components and the microwave components of the short-pulse radar assembly as utilized in the monostatic embodiment of the present invention.

FIG. 15 illustrates the short-pulse monostatic radar system of the present invention. The primary sub-components are the electronics unit 200, the microwave unit 300 and the data unit 400. The basic components of the electronics unit 200 are the utility controller 210, the sampler controller 220 and the 25 timing controller 230. The timing controller 230 provides the pulser trigger signal for the pulser 311 in the microwave unit 300. Although other frequencies are applicable, the timing controller 230 of the present invention preferably provides a 5 MHz pulse trigger to the pulser 311. The 5 MHz pulse trigger initiates a five million pulses from the pulser 311. Likewise the receiver 341 in the microwave unit 300 receives five million pulses.

Other signal stabilizing techniques are used. The present invention provides for temperature stabilization within the microwave unit 300. Temperature stabilization reduces the "drift" associated with fluctuations in temperature. Any known device for stabilizing temperature is readily adaptable for use with the present invention.

As illustrated in FIG. 2, the microwave unit 300 is typically mounted on the back of a vehicle 10. As the vehicle moves across the road or other surface being examined, the microwave unit 300, and particularly the transmitting and receiving antennas 330 and 360, respectively, will have vertical movement due to the lack of uniformity of the surface. As the microwave unit 300 moves up and down, the accumulated data is distorted. Such distortion is eliminated using, for example, an electromechanical device for accurately determining the instantaneously distance from the surface to the microwave unit 300. Alternately, the utility controller 210 can utilize a soil lock system as described in U.S. Pat. No. 4,072,942 to Alongi.

In an alternate embodiment the microwave unit 300 is contained in its own independent nonconducting enclosure 380. The non-conducting enclosure 380 of the present invention is made of a thin layer of fiberglass around a foam interior. The top of the enclosure 380 contains the pulser 310 and the sampler 340. The pulser 310 is connected directly to the transmitting antenna 330. The direct connection between the pulser 310 and the transmitting antenna 330 is the delay line and transmission cable 320.

It has been determined that the use of the transducer taught by the Wohlers patent, U.S. Pat. No. 399,843 is very effective in practicing the present invention. However, practicing the invention taught in the Wohlers patent has been extremely continuous based upon the performance of transistors. The Wohlers patent requires that an avalanche oscillation be initiated. It is very difficult to find transistors with the specific characteristics to cause sufficient avalanches. It is has been found that using an NEC transistor No. 2SC639 greatly increases the probability of achieving an avalanche oscillation in practicing the Wohlers pulse generator. In using the NEC No. 2SC639 transistor a narrow distribution arise time is created, creating a narrow pulse duration which greatly enhances the applicability of the Wohlers invention.

Figure 26:
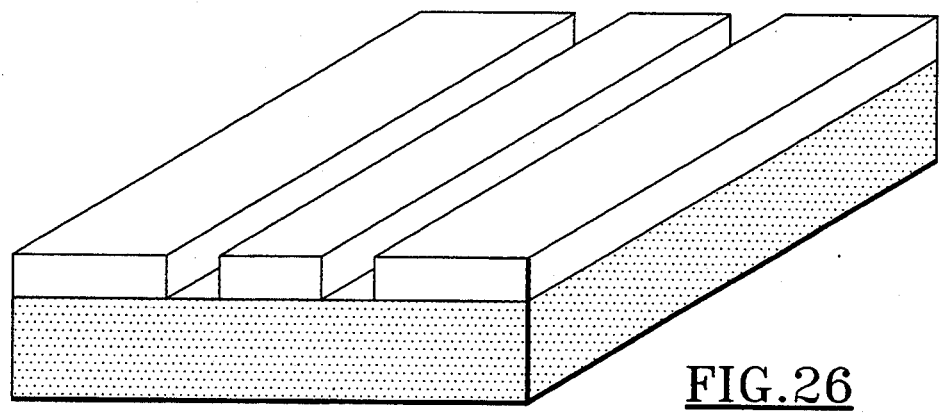
FIG. 26 illustrates one embodiment of a structure of a coplanar waveguide.

Alternately, and in place of the Wohlers device, the present invention teaches the use of a planar wave guide structure. FIG. 26 is an illustration of the coplanar wave guide structure practiced by the present invention. Such structures are applied directly to the board upon which the electronics is assembled. The "cavity" assembly and open-stub coaxial line practiced by the Wohlers pulse generator is completely replaced by a coplanar wave guide structure. Such a design represents a significant savings in the cost of parts, manufacturing, and quality control. Indeed the planar wave guide implementation can be used in conjunction with a cavity pulser as taught by the Wohlers patent. The planar wave guide structure as copper transmission lines which simulate coaxial lines, such as for example, microstip, coplanar and the like. The implementation as practiced by the present invention gives a sharp rise time sufficient for practicing the present invention. It is preferred that microwave materials be used in manufacturing the PC-board material when practicing the present invention.

The antennas 330 and 360 are both wide band air coupled TEM antennas. TEM antennas are transverse electromagnetic antennas. The two antennas 320 and 360 are identical. It is important to emphasis that the thrust of the entire microwave unit 300 is that everything in it is microwave. The present microwave unit 300 is fabricated for a particular use. The present microwave unit 300 is not tuned or corrected in the field, and indeed no adjustment is required after the initial tuning during manufacture. It is typical for existing units to require adjustment of the microwave components, and such adjustment causes many problems in coordinating the respective microwave components. For example, every time a microwave connection is made the signal deteriorates, and unwanted clutter signals occur. The microwave unit 300 of the present invention is fixed and no components are ever altered or changed. The only connection between the microwave unit 300 of the present invention and the other components are a cable to the electronics unit 200.

The antenna design used with the present invention can be a standard design as taught by Calspan. However in a straight flared embodiment, the present invention incorporates an antenna design whereby the leaves in the antenna are much thicker. In other words, the metal leave associated with the TEM antenna has extra thickness. The extra thickness has been found to be approximately 0.025 inches. The metal leaves in the present invention are made of brass. When utilizing the present invention the antenna has a "dead" spot. The dead spot is behind the wide part of the tear drop shaped leave. It has been found that placing the microwave pulser and sampler in the dead spot affixed to the antenna greatly reduces the noise associated with the present invention.

Figure 13:
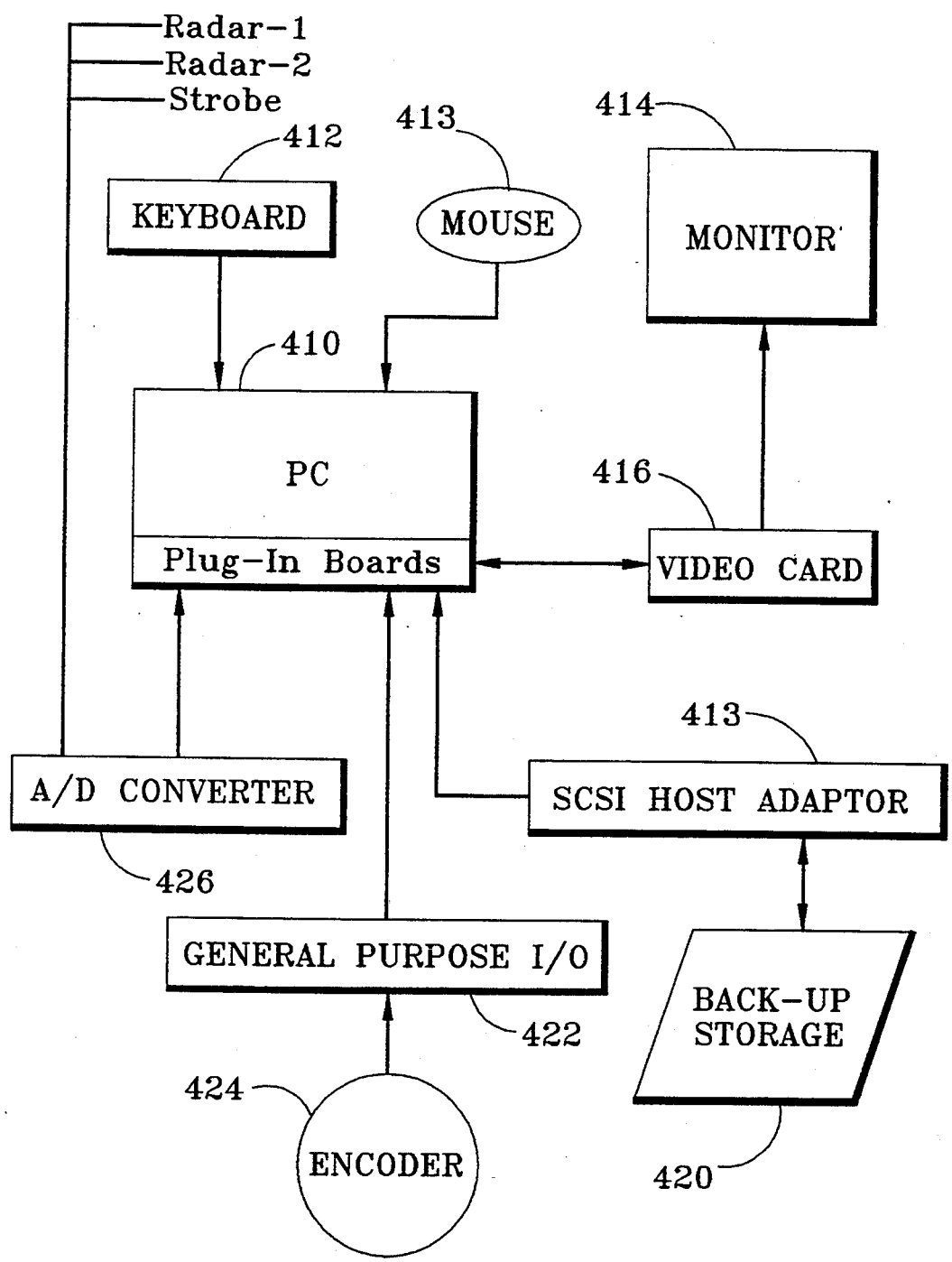
FIG. 13 depicts the segregation of the electronics components and the microwave components of the short-pulse radar assembly of the present invention.

As illustrated in FIG. 13, the data unit 400 of the present invention comprises a personal computer 410, a keyboard 412, a mouse 413, a monitor 414, a video card 416, a SCSI host adapted 418, a backup storage device 420, a general purpose input-output device 422, an encoder 424 and an analog-to-digital (A/D) converter 426. In the preferred embodiment of the present invention, a 386-based personal computer 410 adaptable for receiving plug in boards is used. The presently preferred embodiment of the invention uses four interface boards with the computer 410. Two of the boards are input boards and two of the boards are output boards. The A/D converter 426 is a WAAG2 channel analog-to-digital converter. The converter 426 receives the data from the electronics unit 200 for processing by the data unit 400. The analog radar data is synchronized with a strobe signal. The strobe signal is initiated 50 times a second enabling the computer 410 to receive radar data from the electronics unit 200. The general purpose I/O board 422 is a Metrobyte CTM05. The general purpose I/O board 422 is used to interface with the encoder 424. The encoder 424 is provided as part of a fifth wheel associated with the vehicle 10. The fifth wheel rolls along the surface to accurately measure the exact location of the microwave unit 300 with respect to the surface 12. For example, the fifth wheel can be a bicycle wheeltype device with an optical encoder. The vehicle carrying the radar system also pulls the fifth wheel across the surface creating a string of pulses from the optical encoder. The string of pulses from the optical encoder are accumulated in a counter in the general purpose I/O card 422. When the computer 410 requires location data with respect to the microwave unit 300, the computer 410 simply accesses the I/O card 422 to receive the location data. A typical configuration would be to have 25 counts equal to one linear foot.

The SCSI host adapter board 418 provides output to the backup storage 420. The SCSI hose adapter board 418 can be a Western Digital 7000 FAAST board. The adapter board 418 can be connected to any backup storage device such as a tape or disk drive. In the present invention, a Wangtek 6130 tape drive is connected to the computer 410 via the SCSI host adapter board 418. The backup storage 420 records the location data and the radar data for archival storage. The data stored on the backup storage 420 can be played back for analysis at any time after data acquisition. The particular drive used in the preferred embodiment of the present invention holds approximately 1300 megabytes of data over approximately 10 hours of continuous radar data. The 13 megabytes of data can be stored on four millimeter tape.

A single small 4 millimeter DAT tape maybe useful in any Geophysical Information System. Such 4 millimeter DAT tapes can be used by, for example a highway department, as part of their system for maintaining data of all types. For example data may be maintained of as—built data, various road surveys, maintenance records, and the like. Anybody using such maintained records could ask for information of a certain section of road and get the radar data for various surveys which have been made. The 4 mfilimeter DAT tapes can be associated with a carousel-type device which will allow the integration of vast amounts of radar data into an easily accessible system.

The video card 416 is used to connect a monitor 414 to the computer 410. In the presently preferred embodiment of the present invention a standard EGA video card is used to interface an EGA color monitor 414 to the computer 410. Thus, the color monitor 414 receives the data at the same time as the backup storage device 420. In the preferred embodiment of the invention, colors are used to indicate the strength of the return signals. The present invention utilizes data very similar to that used in seismic studies. The data unit 400 generates a two dimensional graphic on the monitor 414. Typically, horizontal images illustrate a movement along the surface and vertical images represent the depth of penetration into the surface. Thus, horizontal lines represent the reflecting layers underneath the road or surface. A previously discussed, the top of the surface at the air-surface interface is a very strong reflecting layer.

Figure 16:
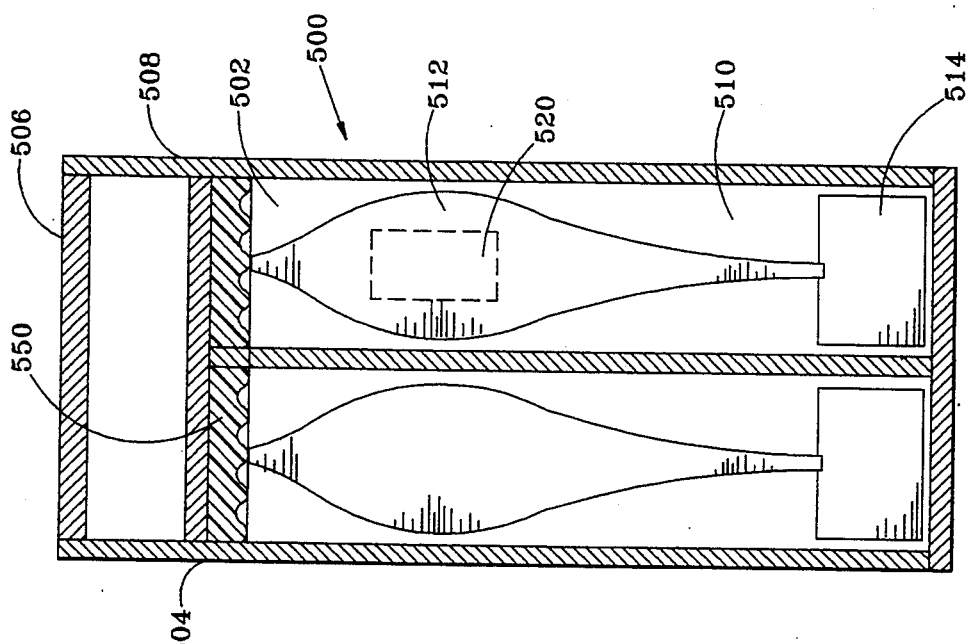
FIG. 16 is an illustration of a preferred embodiment of the antenna structure for use with the present invention.
Figure 17A:
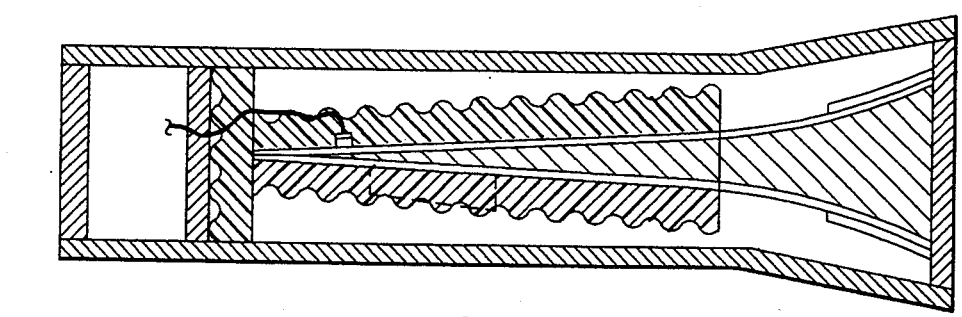
FIG. 17A is FIG. 17 with the corrugated surface of the absorbing material reversed.
Figure 17:
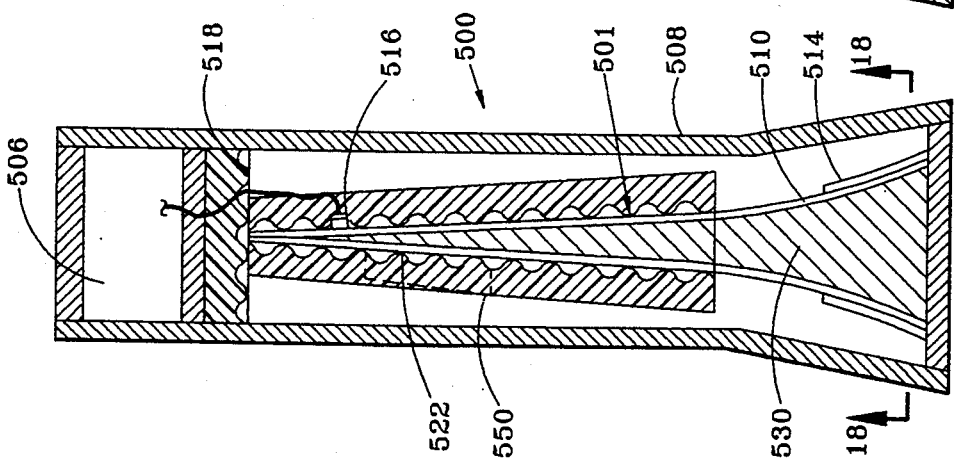
FIG. 17 is a side view of the embodiment of the flared-leaf antenna configuration illustrated in FIG. 16.
Figure 21:
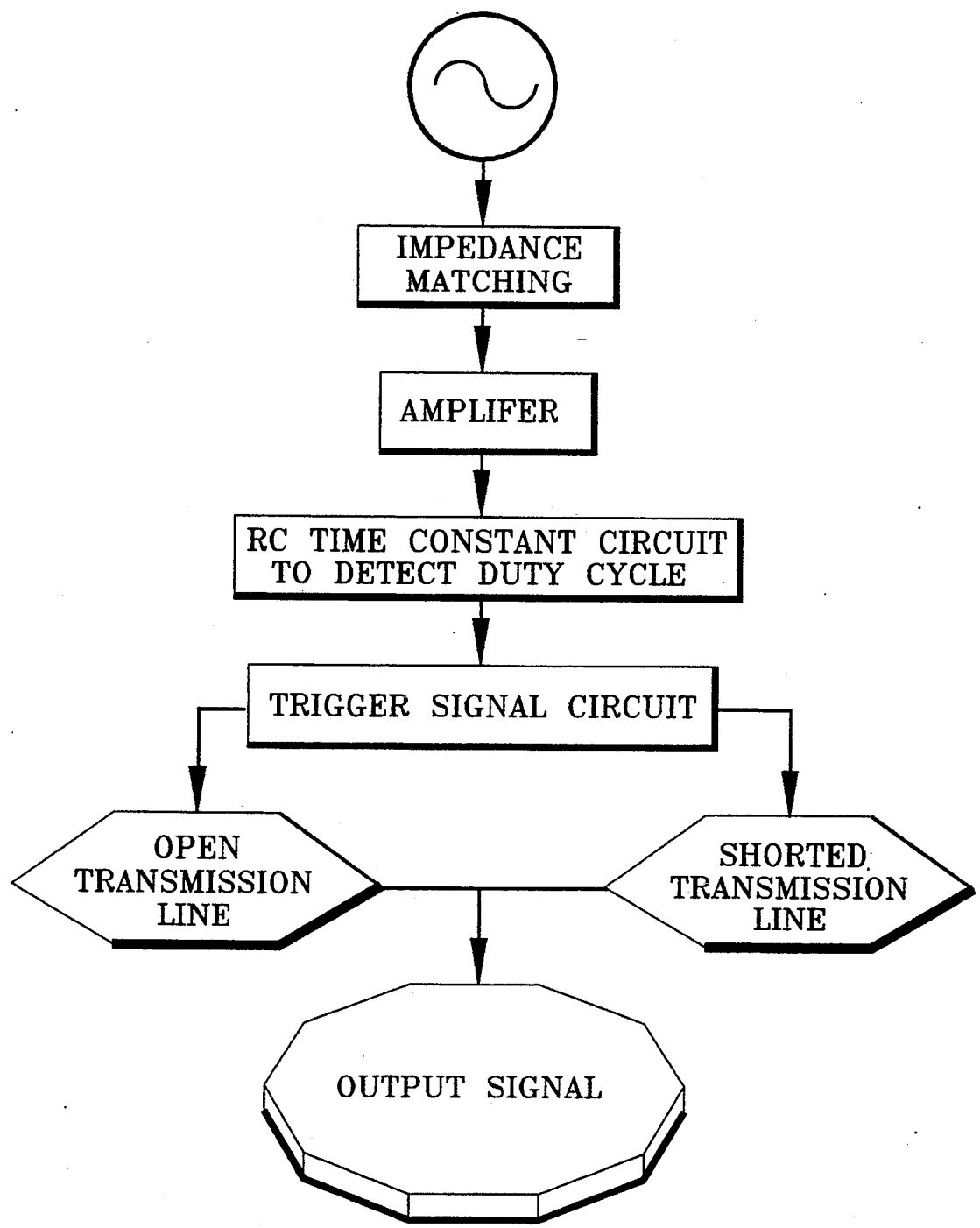
FIG. 21 is a flow diagram of one embodiment of the electronics associated with the pulser of the present invention.

FIGS. 16 and 17 is an illustration of a preferred embodiment of the integrated, monocoque microwave unit 300 for use with the present invention. The preferred antenna embodiment for air-interface applications is a concaved-flared-leaf configuration. The antenna assembly 500 is provided such that one or more antennas 501 can be built into the same antenna assembly 500. The assembly 500 illustrated in FIG. 16 provides for a first antenna compartment 502 and a second antenna compartment 504. It can be appreciated that multiple antenna compartments can be spaced in various arrangements utilizing the integrated, monocoque microwave unit 300 disclosed in the present invention. For example, the antennas 501 illustrated in FIGS. 16 and 17 are arranged in a side-by-side alignment. However other alignments readily available to one skilled in the art are, for example, a front-to-back arrangement, a front-to-front arrangement, a back-to-back arrangement or a diagonal arrangement. Each antenna compartment 502, 504 is shaped by and held in structural integrity by a plurality of supports 508. The supports 508 are made of non-reflective material, for example, Polystyrene ® or Styrofoam ®. Just above the antenna compartments 502, 504 is an electronics compartment 506. The electronics compartment 506 contains the microwave electronic components in close proximity to the antenna 501. In one embodiment of the invention, all of the microwave components are placed in the compartment 506 so that the transmission distance from the microwave components in the electronics compartment 506 to the antennas 501 is minimized. In another embodiment, the microwave components are placed in a location aligned with the fiat surface of the widest portion of the antenna leaf 512 so that the microwave components are "hidden" in a blind spot 520 discovered to be associated with the concaved-flared-leaf configuration antennas 501 used in this embodiment of the invention as well as with flared-leaf configuration antennas as described in the article entitled "The GWIA, An Extremely Wide Band Low-Dispersion Antenna," Cornell Aeronautical Laboratory, Inc., Buffalo, N.Y., 1974. An alternate location for the electronics compartment 522 (dashed lines) is illustrated in FIG. 17. The alternate location for the electronics compartment 522 is positioned in the blind spot 520 of the antenna 512 illustrated in FIG. 16.

The antenna compartment 502 contains a support medium 510 to buttress the antenna leaf 512. The support medium 510 is surrounded by a high absorption, low reflectivity material 550. It has been found that a preferred support medium 510 is printed circuit board (PCB). Affixed to the PCB medium 510 is the antenna leaf 512. The antenna leaf 512 is made in a similar fashion as any PCB application where a conducting material is affixed to the substructure. To avoid reflection when the signal transfers from the antenna into the air, an impedance-matching material or resistance card 514 is engaged with the emitting end of the leaf 512. The resistance card 514 could be, for example, 160 ohm/square.

FIG. 17 is a side view of the embodiment of the flared-leaf antenna configuration illustrated in FIG. 16. FIG. 17 illustrates the supports 508 holding the PCB structure 510 and the high absorption, low reflectivity material 550 surrounding the antenna 501. Preferably, the high absorption, low reflectivity material 550 is multi-dense. The multi-dense characteristic of the high-absorption, low-reflectivity material 550 provides for a higher rate of absorption of noise or clutter creating, extraneous microwaves. Reducing the noise or clutter creating, extraneous microwaves provides that the present invention can achieve a greater efficiency and resolution because of the reduced noise or clutter.

The antenna 501 is joined by a connector 516. The connector 516 has a microwave line 518 to the electronics in the electronics compartment 506. The alternate location for the electronics compartment 522 (dashed lines) is illustrated. The alternate location for the electronics compartment 522 is positioned in the blind spot 520 of the antenna 512 illustrated in FIG. 16.

FIG. 18 is a end view of the embodiment of the flared-leaf antenna configuration illustrated in FIG. 17 along the section line 18—18. A first support 530A and a second support 530B are secured to the first PCB 510A and the second PCB 510B.

FIG. 19 is an illustration of a cross-section of the high absorption, low reflectivity material 550. The high absorption material 550 is made so as to provide an increasingly higher dielectric material as the microwaves pass through it. FIG. 19 illustrates a cross-section of high absorption material 550 having a high absorption section 554, a higher absorption, intermediate section 556, and a highest absorption, final section 558. Also, the high absorption material 550 provides for increased effectiveness by utilizing an initial sinuous surface 552. The sinuous surface 552 of the high absorption material 550 provides the initial contact for the microwaves. The sinuous surface 552 provides that, to the extent reflections are possible with the high absorption material 550, reflections are positioned so as to ultimately be absorbed.

The flare angle or curvature and the length of the antenna are associated with basic characteristics. The flare angle or curvature determines the beam width of the antenna. The present invention adopted a flare angle or curvature of the antenna by empirical design. The length of the antenna determines the magnitude of the reflection coefficient. Thus, the longer the antenna, the lower the reflection coefficient. Generally, the antenna of the present invention receives the input signal at approximately 50 ohms and releases the signal at 377 ohms. The released signal of 377 ohms is the impedance of air. The following equation has been empirically determined:

$$Z = Z_0(1 + e^{-a\cos Bx})$$

Where Z is the impedance of the present antenna, $Z_0$ is the characteristic impedance of feet (50 ohms), B equals $\pi/L$, L is the antenna length, and $\alpha$ has been determined to be approximately 1.85. Obviously, this empirical calculation is adaptable to approximate the impedance characteristics required for adapting an antenna for use with the present invention. It should be readily appreciated by those skilled in the art that various other approximations may be equally appropriate for practicing the present invention, and that the present approximation is provided as information allowing one skilled in the art to make and use the present invention.

The design criteria set forth above, in conjunction with the use of the high absorption, low reflective material 550 has resulted in minimizing, and in cases completely eliminating, the time consuming and expensive tune-up procedures previously required of such antennas. Prior use of antennas relate to those disclosed in the present invention required that resistive sheets be added to the antenna to "tune" the antenna so that extraneous reflected microwave signals do not clutter and deteriorate the efficiency of the device. The use of the high absorption material 550 has significantly enhanced the efficiency previously known to those skilled in the art.

To be effective, the antenna 500 must provide a transition from the electronics system impedance (usually 50 ohms) to that of space or air (377 ohms) while providing a very low reflection coefficient. The level of reflections is critical because any signal reflected by the antenna 500 becomes a source of clutter which can then mask the weak returns from a desired target. Another calculation used in practicing the present invention is the antenna impedance Z, as a function of the distance from the feed point, x, wherein $$Z(x) = 137 \exp\{-\cos(\pi x/L)\}$$

The antenna length is given by L. This formula for Z is plotted in FIG. 20. Z changes smoothly from 50 to 377 ohms over its length. The reflection coefficient, Z'/2Z (the prime, ', denotes the derivative with respect to x) is also plotted. The significance of the cos() term in the Z formula becomes clear: Its derivative is a sin() which is zero at each end. Thus the reflectivity if zero at either end of the antenna while it is minimized through the body. Because the transition occurs over finite length, the reflectivity cannot be eliminated, but it must be minimized.

The relations used to realize this impedance curve are complex but are available in the technical literature; a microstrip formula may be used to determine (using an iterative technique) the width of the opposing radiator elements or leaves used in the antenna design.

A constant angle flared antenna along with its physical length (for example, 40" for the one nanosecond unit) provides the high bandwidth (near 5 octaves) and sharp beam pattern needed for good radar performance.

A new pulser design is a part of and incorporated into the present invention. The unique pulser design incorporates a planar-waveguide structure. The use of a planar waveguide structure improves manufacturability and functionality.

Prior known pulser designs evolved from the design developed pursuant to U.S. Pat. No. 3,997,843 to Wohlers entitled "Monocycle Pulse Generator" which issued on Dec. 14, 1976. The Wohlers design incorporated a cascade of two avalanche-diode pulse-generated circuits, the first driving the second. A cavity structure was used to maintain "clean" RF properties in the final stage. The cavity was and is difficult to assemble and almost impossible to tune. The present invention replaces the cavities with planar-waveguide structures. These changes allow for gross-tuning and fine-tuning of the circuit performance.

Figure 22:
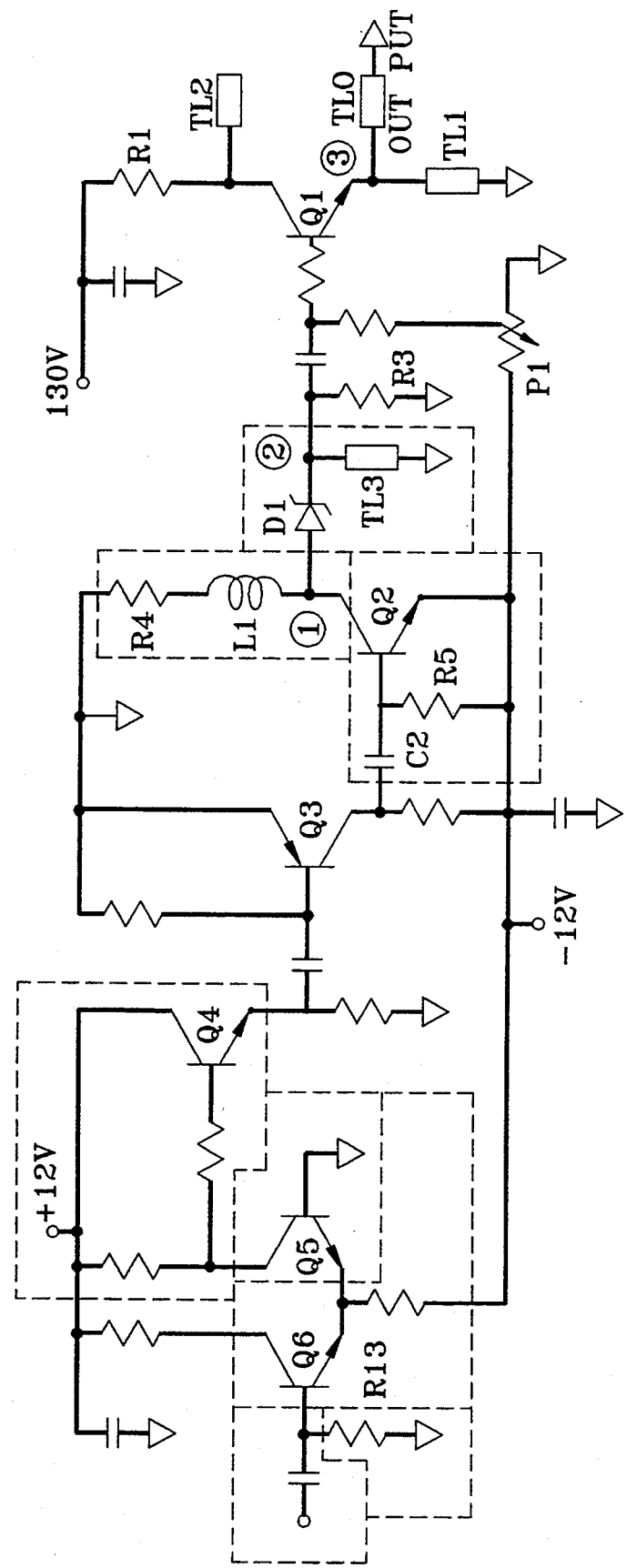
FIG. 22 is a schematic of one embodiment of the electronics associated with the pulser of the present invention.

A schematic of one embodiment of the pulser circuit is shown in FIG. 22. A 5-MHz TTL-level square wave drives the Q5/Q6 differential-amplifier circuit. The 50-Ω input resistor R13 is intended to improve the transmission-line termination impedance. The differential amplifier, the Q4 amplifier stage, and the Q5 amplifier stage provide buffering between the input control and the pulse-generating circuitry. A capacitor C2, along with the input impedance of a transistor Q2 in parallel with a resistor R5, provides an RC time constant that determines the duty cycle at Node 1. Under steady-state conditions, the transistor Q2 is turned "on" for a period of time- thus generating a current through the R4/L1 circuit. Since there is no instantaneous change in current through an inductor, when the transistor Q2 is switched "off," this current is directed through a diode D1 to ground via a shorted-transmission-line TL-3.

A HSCH-5082-0153 step-recovery-diode (SRD) is used to generate a very narrow drive pulse for the transistor Q1. A charge is stored in the junction of the SRD during forward bias. When reverse biased, the SRD conducts current, as though it were forward biased, until all the stored charged is swept out of the junction. Once the charge is removed, the diode conduction ceases. The diode doping characteristics are intentionally shaped to make the "on-to-off" transition occur very rapidly. The "on-to-off" transition time may be as low as 10ps in some SRDs; therefore, they may be used to "sharpen" rise- and fall-times of switching circuits.

Figure 23:
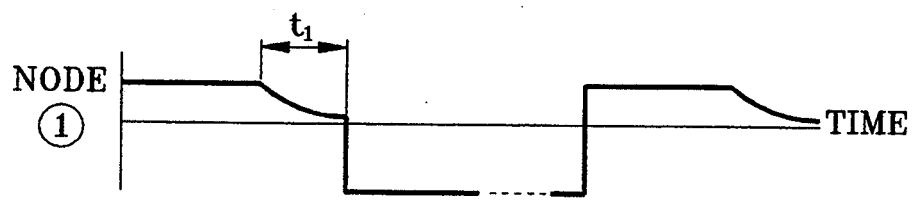
FIG. 23 illustrates the signal at Node 1 of a preferred embodiment of the pulser of the present invention.

FIG. 23 illustrates the waveform present at Node 1. Initially, the diode is forward biased and the voltage is approximately 12 V, forcing a step change in current through the diode. The reverse current begins sweeping charge out of the SRD junction. This current initially flows through the 50-Ω resistor. After the initial current step travels the length of the shorted transmission line, the SRD reverse current is supplied through the shorted-transmission-line TL3. This pulse is generated when the SRD switches off. Immediately prior to the switch time, reverse current is flowing through the diode D1 and the shorted-transmission lines TL3. The transition time of the HSCH 5082-0153 diode is approximately 100 ps. At the frequencies that comprise the 100-ps transition, the shorted-transmission-line TL3 appears inductive. The current that was flowing through the diode D1 now flows through the 50-Ω resistor, generating a corresponding voltage Step at Node 2.

Figure 24:
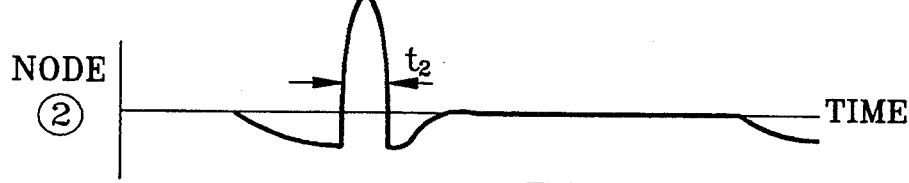
FIG. 24 illustrates the signal at Node 2 of a preferred embodiment of the pulser of the present invention.

The voltage step is illustrated in FIG. 24 as the rising edge of the pulse. The voltage step travels to the end of the transmission line. The termination short circuit launches a 25 return wave of equal but opposite sign back to the resistor, that cancels the original step. This is indicated in FIG. 24 as the falling edge of the waveform. The pulse width $t_2$ is directly related to the length of the shorted-transmission line TL3, as its length increases, so does the pulse width. Although the SRD may turn "off" in 100 ps, the pulse rise is longer because of circuit parasitics. The circuit parasitics prevent the peak voltage from reaching its maximum before the return pulse cancels it. Therefore, the peak voltage generated in the circuit is related to the pulse width. A wider pulse width $t_2$, corresponding to the shorted-transmission line TL3 being longer, results in a greater peak voltage $V_2$.

The output pulse is generated by the transistor Q1. The SRD pulse is used as a trigger signal. The transistor Q1 is a switching transistor used in the avalanche mode. The collector voltage is variable from approximately 86 to 120 volts DC, which exceeds the rated breakdown voltage (Vceo) of the transistor Q1. Vceo is the collector-emitter breakdown voltage with the base open. Under an open-circuited condition, as Vce exceeds Vceo, charge carriers punch through the junction of the device into the base region. These carriers provide bias for the base-emitter junction, which allows current to flow from the collector to the emitter and more carriers to leak into the base region, i.e., creating a runaway or avalanche condition. The transistor avalanches as fast as the junction reactances will allow, roughly equal to the rise time of the transistor.

The avalanche breakdown voltage is increased when the base-emitter junction is reverse biased. The transistor Q1 can withstand a Vce > 130 volts with a −12 volts Vbo. A potentiometer P1 is used to provide such a reverse voltage. By adjusting the reverse bias voltage (Vbe) and collector bias voltage (Vce), the circuit may be set very near a stable avalanche point. When the SRD pulse drives the base voltage slightly higher, the circuit avalanches.

The output waveform is shaped by an open-transmissionline TL2 and a shorted-transmission-line TL1. Prior to avalanche, the collector is charged to a large voltage, for example, 100 volts. The emitter is stabilized at ground potential because of the shorted-transmission-line TL1. Upon avalanche, the collector and emitter voltages are superimposed, ideally creating voltage steps on the shorted-transmission-line TL1 and the open-transmission-line TL2 of approximately ±50 volts, respectively. The open-transmission-line TL2 −50 volt step reflects off the transmission-line open circuit, launching a −100 volt step back to the collector. Upon return, the collector voltage drops to approximately 0 volts, thus releasing the transistor from its avalanche condition. Neglecting for a moment the effect of the shorted-transmission-line TL1, the resulting emitter waveform is a very sharp pulse whose width is determined by the 2-way travel time of the voltage step on the open-transmission-line TL2. This is shown as $t_3$ in FIG. 25.

The shorted-transmission-line TL1 is used to replicate the positive going pulse and delay the pulse by exactly the pulse width. The short-circuited transmission line TL1 is approximately twice the length of the open-transmission-line TL2. Therefore, the transistor avalanches and recovers prior to any reaction of the shorted-transmission-line TL1 circuit. The impulse, indicated as $t_3$ in FIG. 25, travels to the end of the shorted-transmission-line TL1. An inverse impulse of equal, but opposite magnitude, is launched back toward the emitter. The 2-way travel time defines the relative superposition of the two pulses at the emitter, indicated in FIG. 25 as $t_4$. As a practical assumption, the output transmission line TL0 may be considered infinite in length. Therefore, it may be modeled as an ideal 50-Ω resistor. This provides a matched termination for the shorted15 transmission-line TL1, thus preventing multiple reflections at the emitter. The output transmission line TL0 forms the output port for transmission of the waveform to the antenna.

The three transmission lines TL2, TL2, TL3 determine the structure of the output waveform. As indicated above, the length of the open-transmission-line TL2 determines the individualimpulse pulse widths and the length of the shorted-transmissionline TL1 determines the time position of its image. The shorted- transmission-line TL3 has a secondary effect on the purity of the output signal. All three transmission lines are of fixed length in the prior known Wohlers design. The shorted-transmission-line TL1 and the shorted-transmission line TL3 are realized as copper-jacketed coaxial transmission lines. The open-transmission-line TL2 is realized using a cavity structure intended to minimize package-parasitic affects. The length of the two copper-jacketed transmission lines may be altered with some effort, but the length of the shorted-transmission-line TL1 is virtually impossible to change. Therefore, the impulse pulse width is permanently fixed.

FIG. 26 illustrates one embodiment of a structure of a coplanar waveguide. The coplanar-waveguide structure provides the flexibility to tune the design on the test bench. Since the ground plane is on the same plane as the center line, adjustment of the shorted-stub length is easily accommodated. Likewise, cutting the center conductor with an knife provides adjustment of the open-stub lengths. To minimize the negative effects of the transistor package parasitics, the transistor metal housing may be mounted directly on the open-transmission-line TL2 waveguide structure since the collector and metal case are electrically connected internally.

The coplanar-waveguide design allows the pulse shape to be turned over a wide range of possibilities. The typically definition of pulse performance refers to the single-cycle zero-crossing time interval or its inverse, the monopulse frequency, shown as $t_5$ in FIG. 25. The system of the present invention is designed in one embodiment to utilize a 1-GHz (or $t_5 = 1ns$) monopulse frequency. However, the optimum monopulse frequency is dependent upon the application. For finer radar resolution, a higher monopulse frequency is desired. For deeper ground penetration, a lower monopulse frequency is preferred. The coplanar-waveguide design allows one circuit to support a range of applications. Frequencies as low as several hundred MHz are achievable. This limit is determined more by the reliability of the transistor while operating in the high-current-density avalanche mode. The longer the avalanche condition exists, the higher the probability of damage to the transistor.

Figure 25:
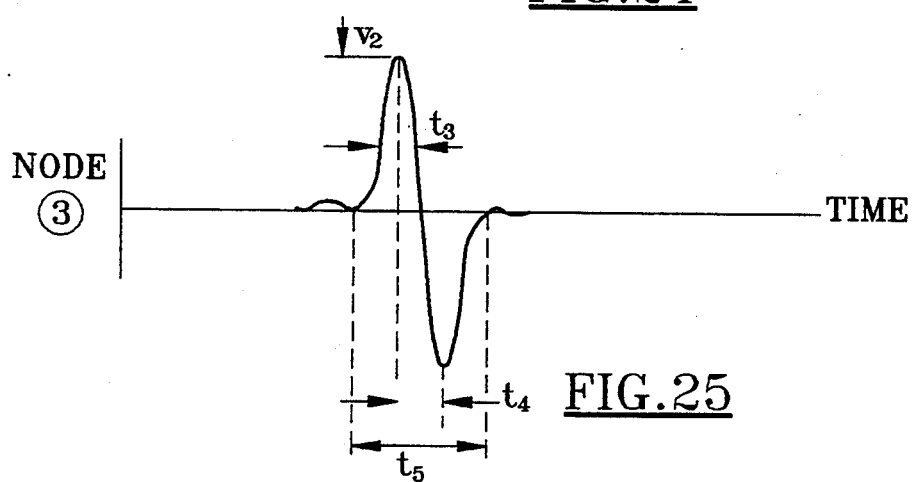
FIG. 25 illustrates the signal at Node 3 of a preferred embodiment of the pulser of the present invention.

As indicated in FIG. 25, time-domain sidelobes exist before and after the desired monopulse signal. The coplanar waveguide of the present invention provides yet another advantage. The magnitude of these trailing sidelobes directly, and adversely, affects the performance of the radar. The resistor R2 was determined empirically to minimize multiple reflections in the shorted-transmission line TL3 for improving the performance of the trailing sidelobes. The magnitude of this ringing may be minimized by tuning on the open and shorted stubs, thus optimizing the pulser performance well beyond that achievable by the prior known cavity-structure design.

The coplanar-waveguide design offers improved manufacturability and tuning flexibility over the prior designs. The innovation of this design is the use of a planar waveguide structure to provide flexibility without sacrificing circuit performance. Similar results may be achieved by utilization of other planar waveguide structures, such as a microstrip configuration.

Figure 27:
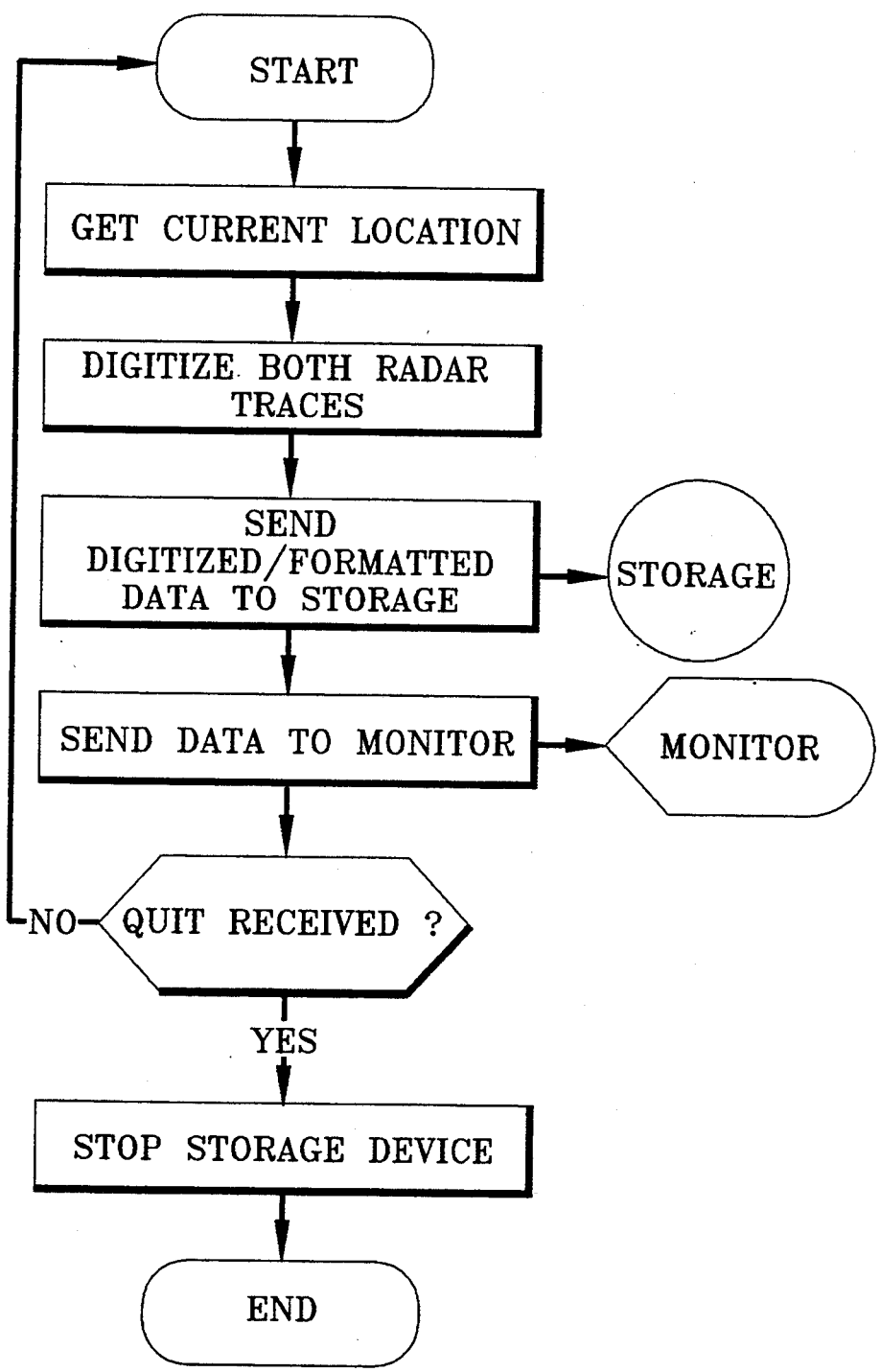
FIG. 27 is a flow diagram illustrating an embodiment of the record mode for the data unit of the present invention.
Figure 28:
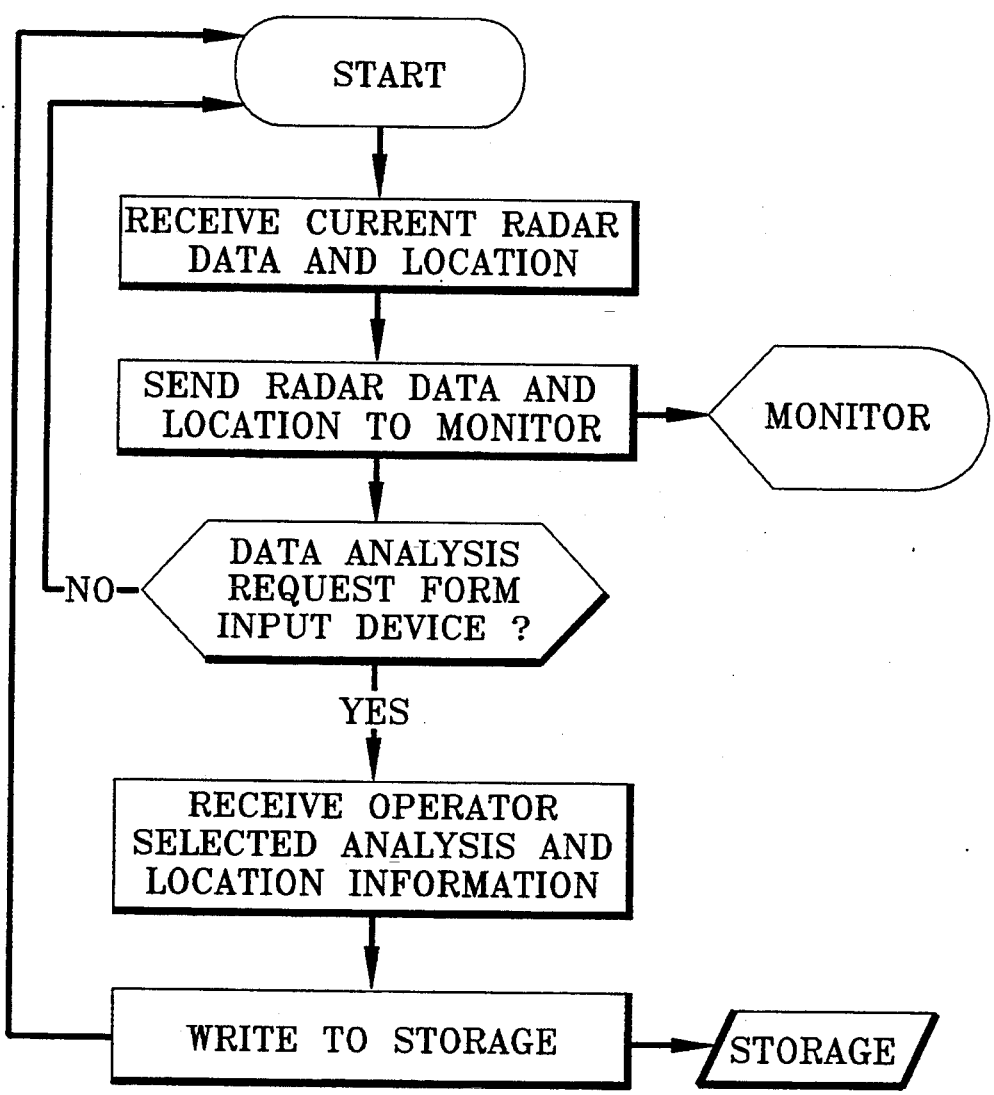
FIG. 28 illustrates the format for digital storage of radar and location data used in the software of the present invention.

FIG. 27 is flow diagram illustrating the record mode and the playback mode of the data unit 400. The mode begins by receiving the current location data. The data unit 400 receives the digitized radar data from the utility controller 210 of the electronics unit 200. The digitized data is sent to the storage device 420 as well as to the monitor 414. The keyboard 412 or the mouse 413 are used to stop and start the recording process.

The playback mode assumes that a tape or disk is installed in the storage device 420 and that the main supervisory program is up and running. FIG. 27 illustrates the format for digital storage of the radar data and location data. As information is received in the playback mode, the data is sent to the monitor 414 for display. The monitor 414 acts similar to an oscilloscope display. At the time of playback, the operator can annotate the data and generate a "pick" file which more clearly represents the subsurface structure under evaluation. The "pick" file is basically a text file indicating interesting spots in the radar/location data. The mouse 413 can be used by the operator to identify in the playback data specific characteristics, for example, moisture, the thickness of the various surfaces, voids, etc. The mouse 413 implements a cross hair-type cursor on the monitor 414. The mouse 413 and the cross hair-type cursor provide for the location of specific spots utilizing pull-down menus. The pull-down menus provide a selection of the specific type of defect. Also the pull-down menus can provide the selection of comments with respect to a particular location pointed out using the cross hair-type cursor.

The present invention automatically records the depth under the surface as well as its respective location longitudinally down the surface. A text file is created which is readily accessible by the operator.

Figure 29:
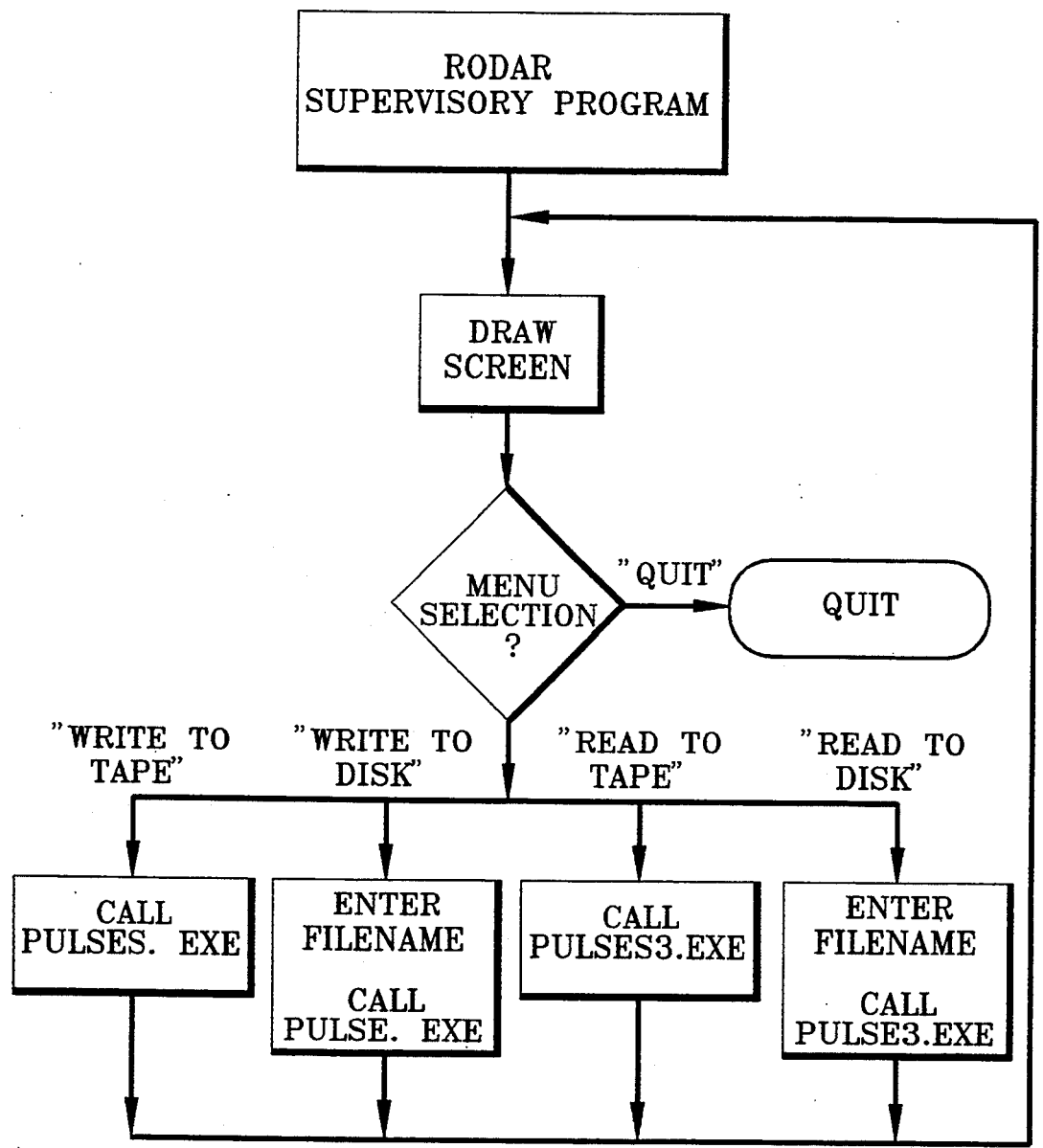
FIG. 29 is a flow diagram illustrating the software used to supervise the data unit of the present invention.
Figure 30:
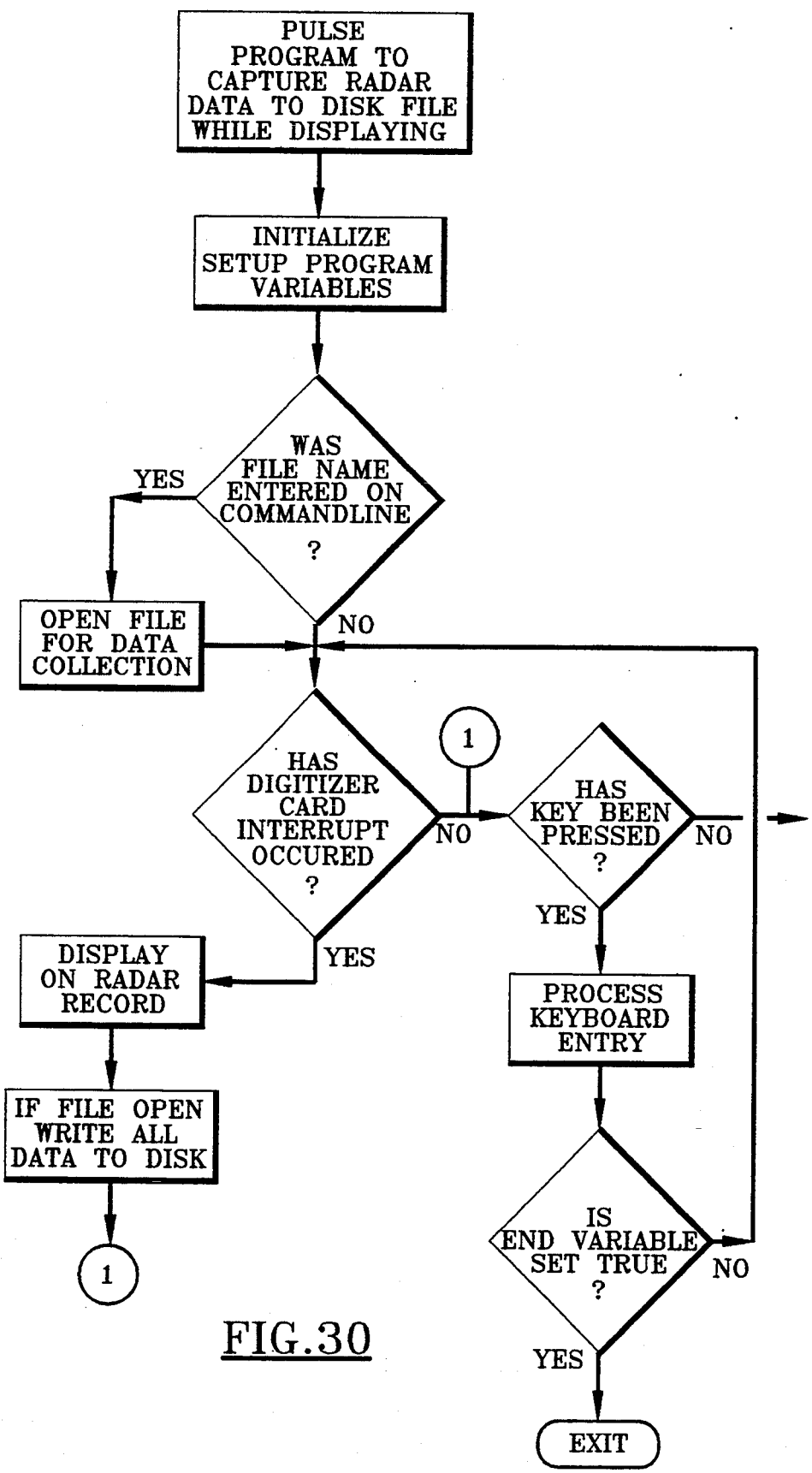
FIG. 30 is a flow diagram illustrating the software used in the present invention to capture radar data to a disk storage device and, simultaneously, to display the data.
Figure 31:
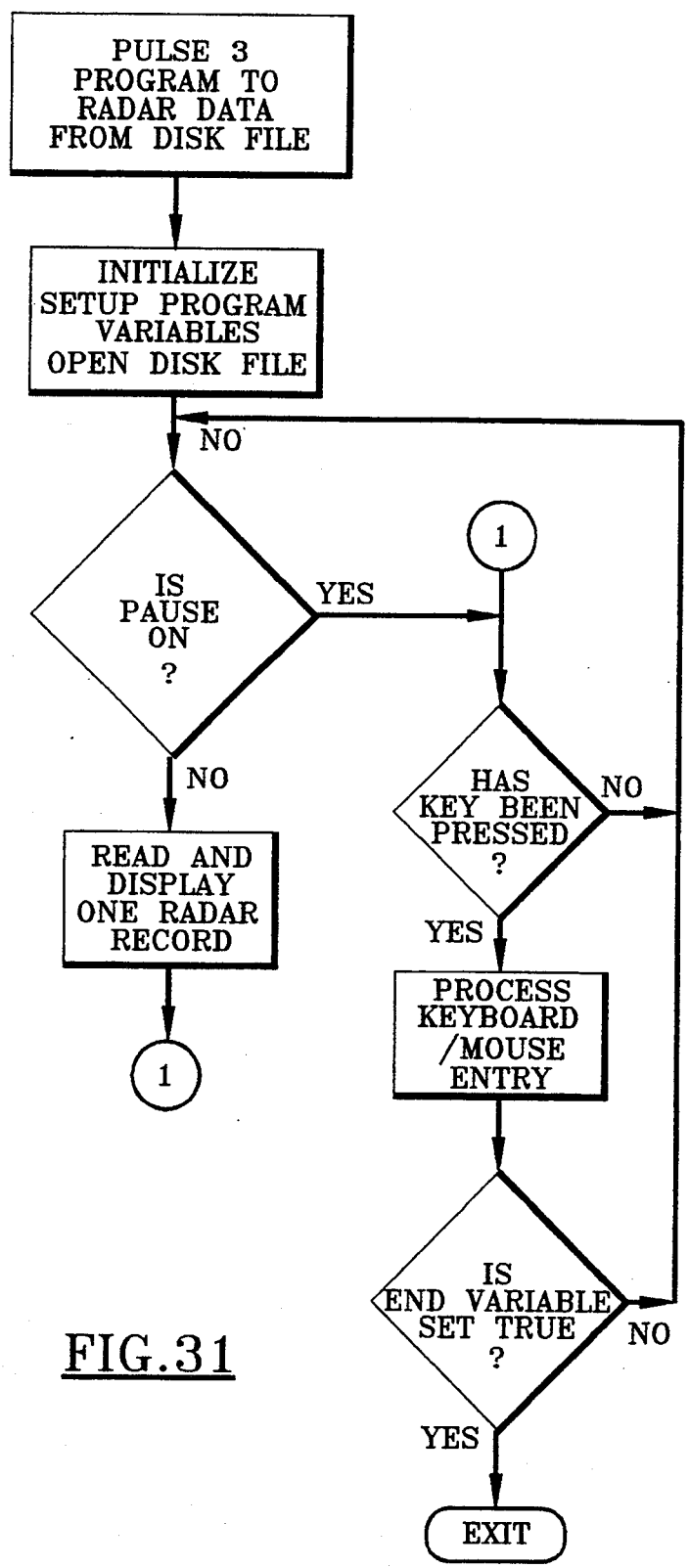
FIG. 31 is a flow diagram illustrating the software utilized by the present invention to display the radar data from a disk storage device as practiced in the present invention.
Figure 32:
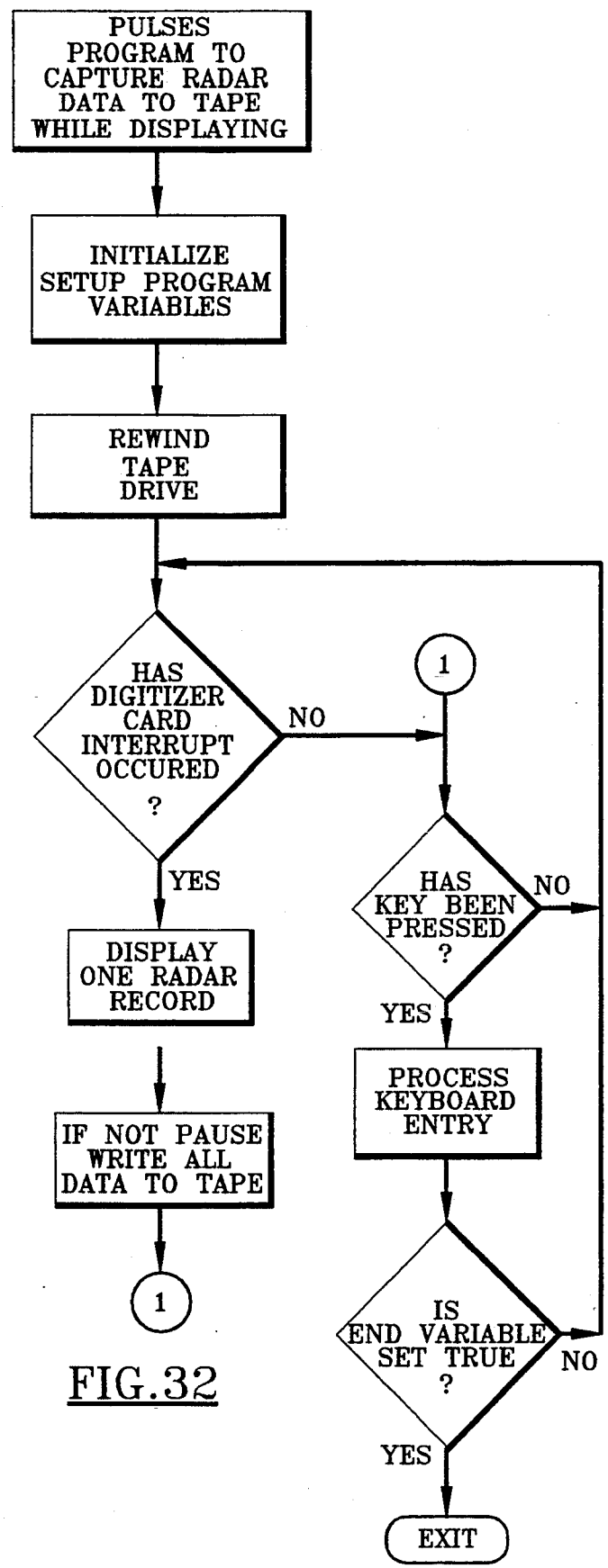
FIG. 32 is a flow diagram illustrating one embodiment of software used in the present invention to capture radar data to a tape storage device and, simultaneously, display the data.
Figure 33:
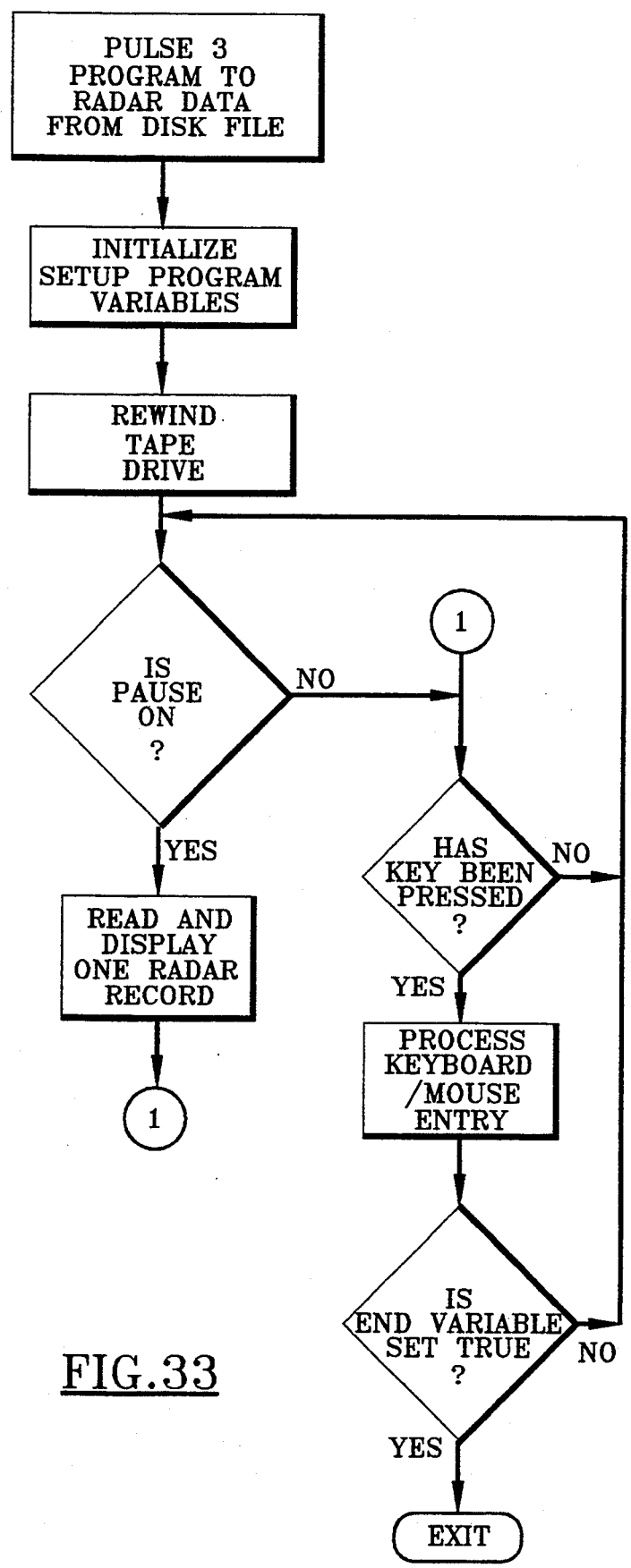
FIG. 33 is a flow diagram illustrating the software utilized by the present invention to display the radar data from a tape storage device as practiced in the present invention.
Figure 34:
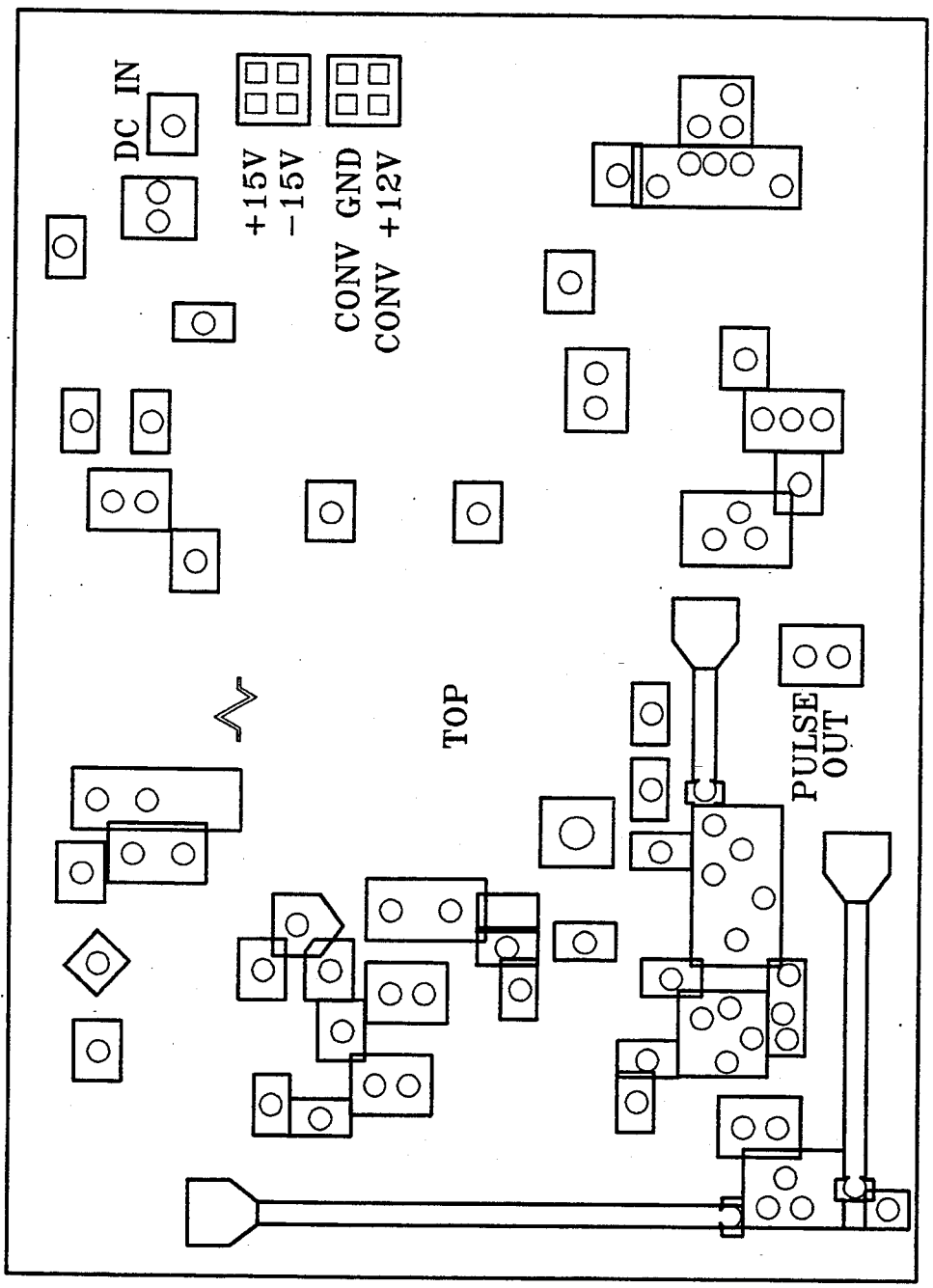
FIG. 34 one embodiment of a top layout of a two-sided printed circuit board used for the pulser of the present invention.
Figure 35:
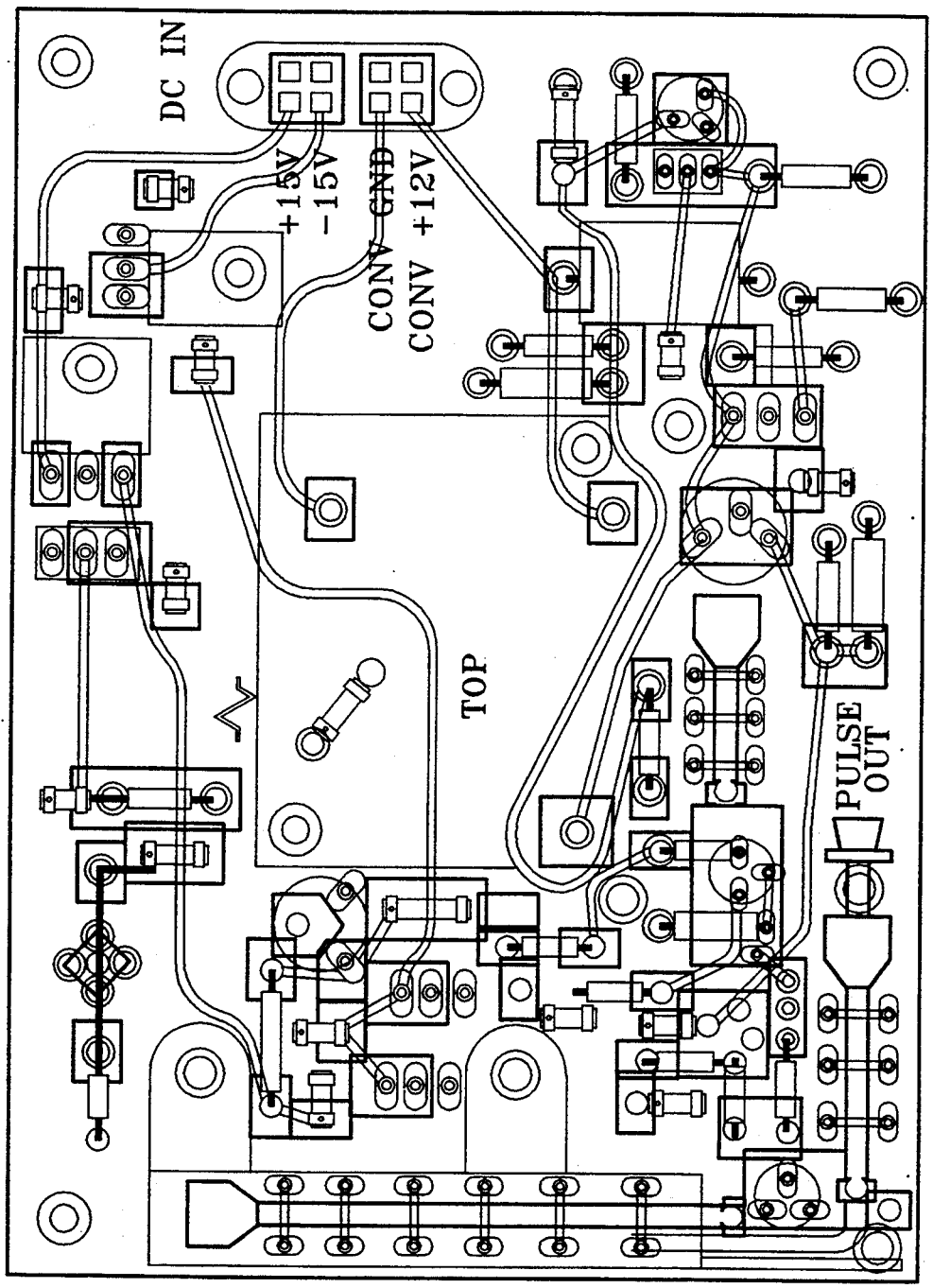
FIG. 35 the associated top layout of the two-sided printed circuit board used for the pulser of the present invention illustrated in FIG. 34.
Figure 36:
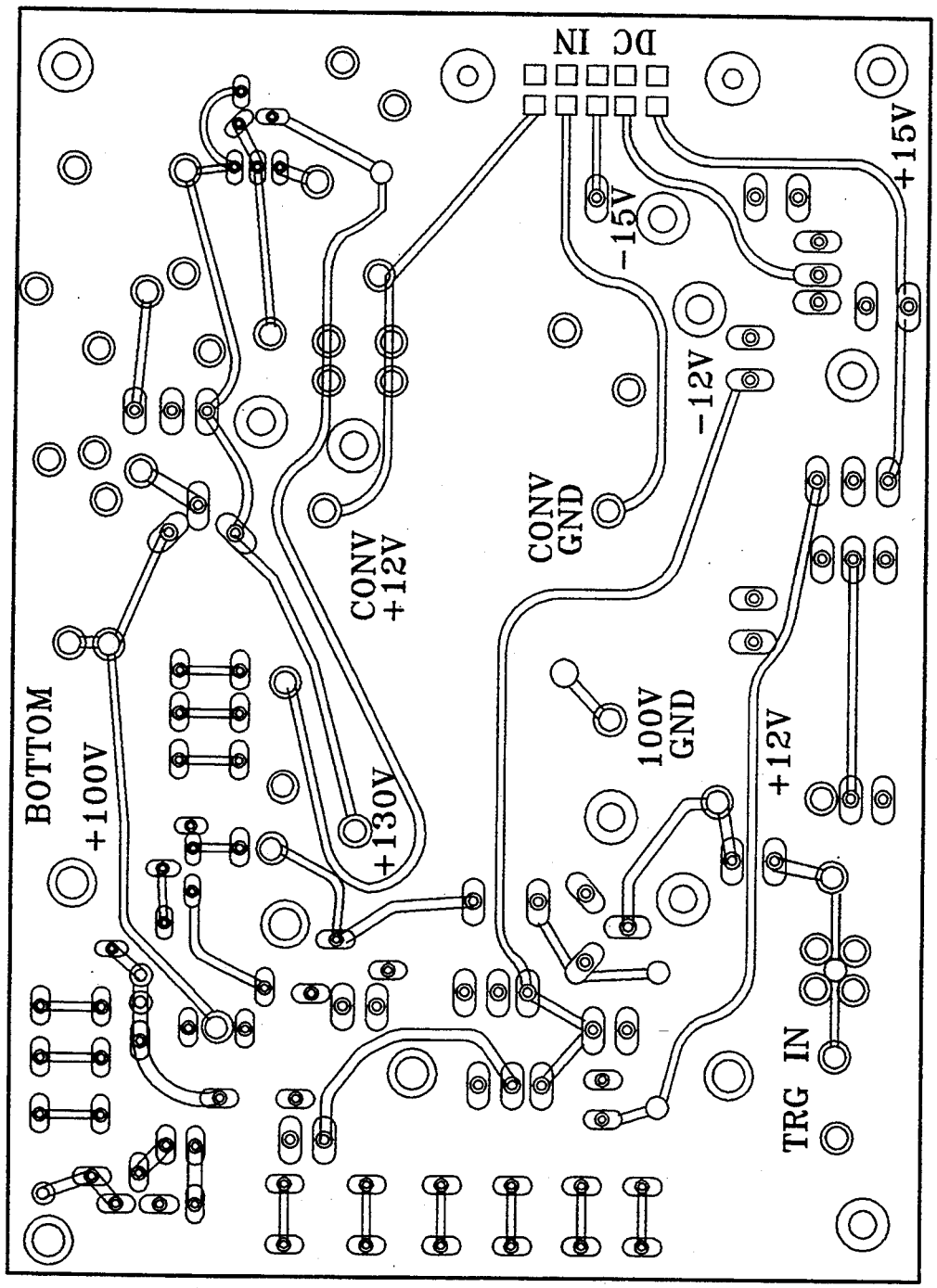
FIG. 36 the associated bottom layout of the two-sided printed circuit board used for the pulser of the present invention illustrated in FIG. 34.
Figure 37:
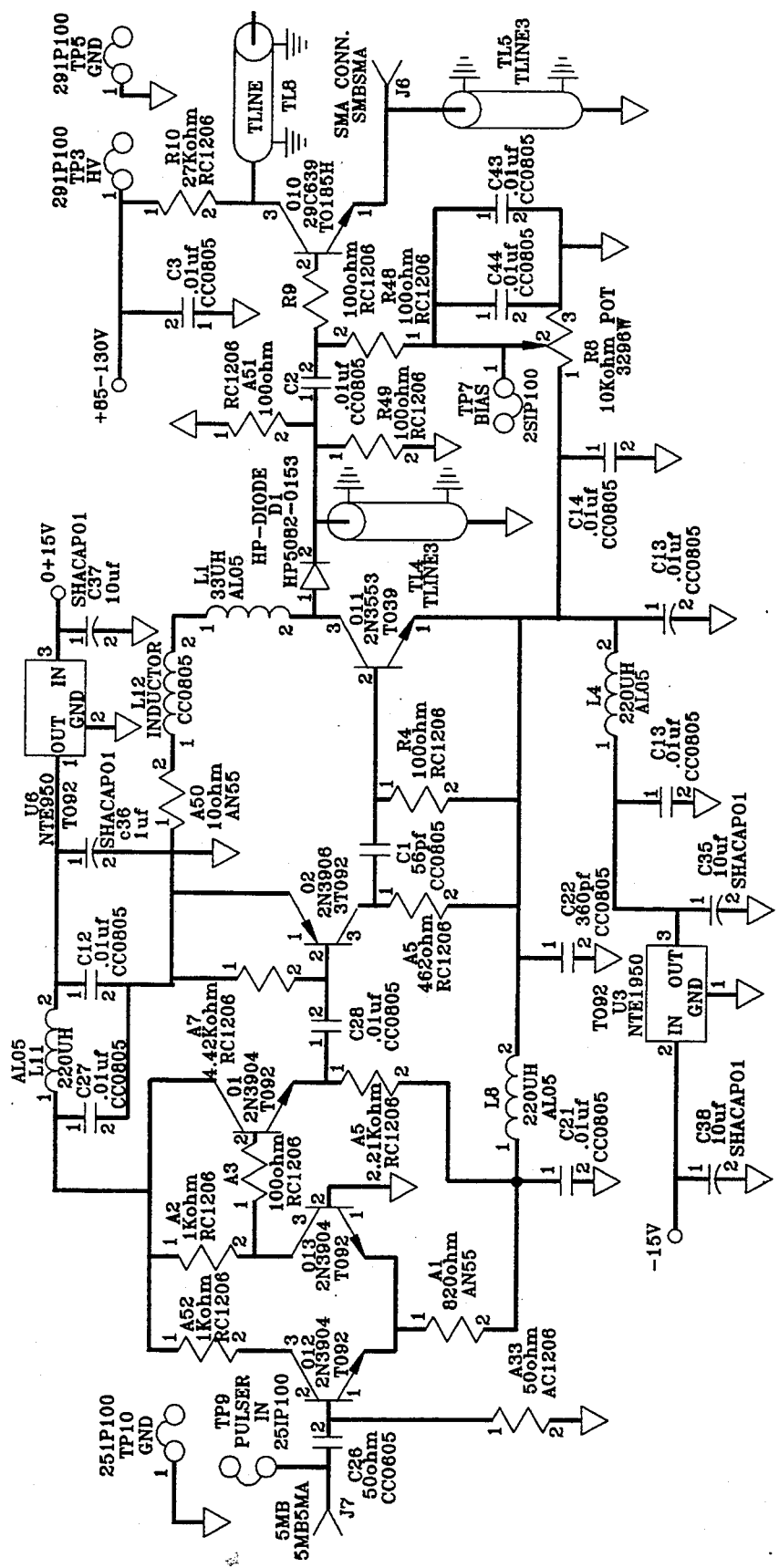
FIGS. 37 through 39 illustrate a schematic of a second embodiment of the electronics associated with the pulser of the present invention.
Figure 38:
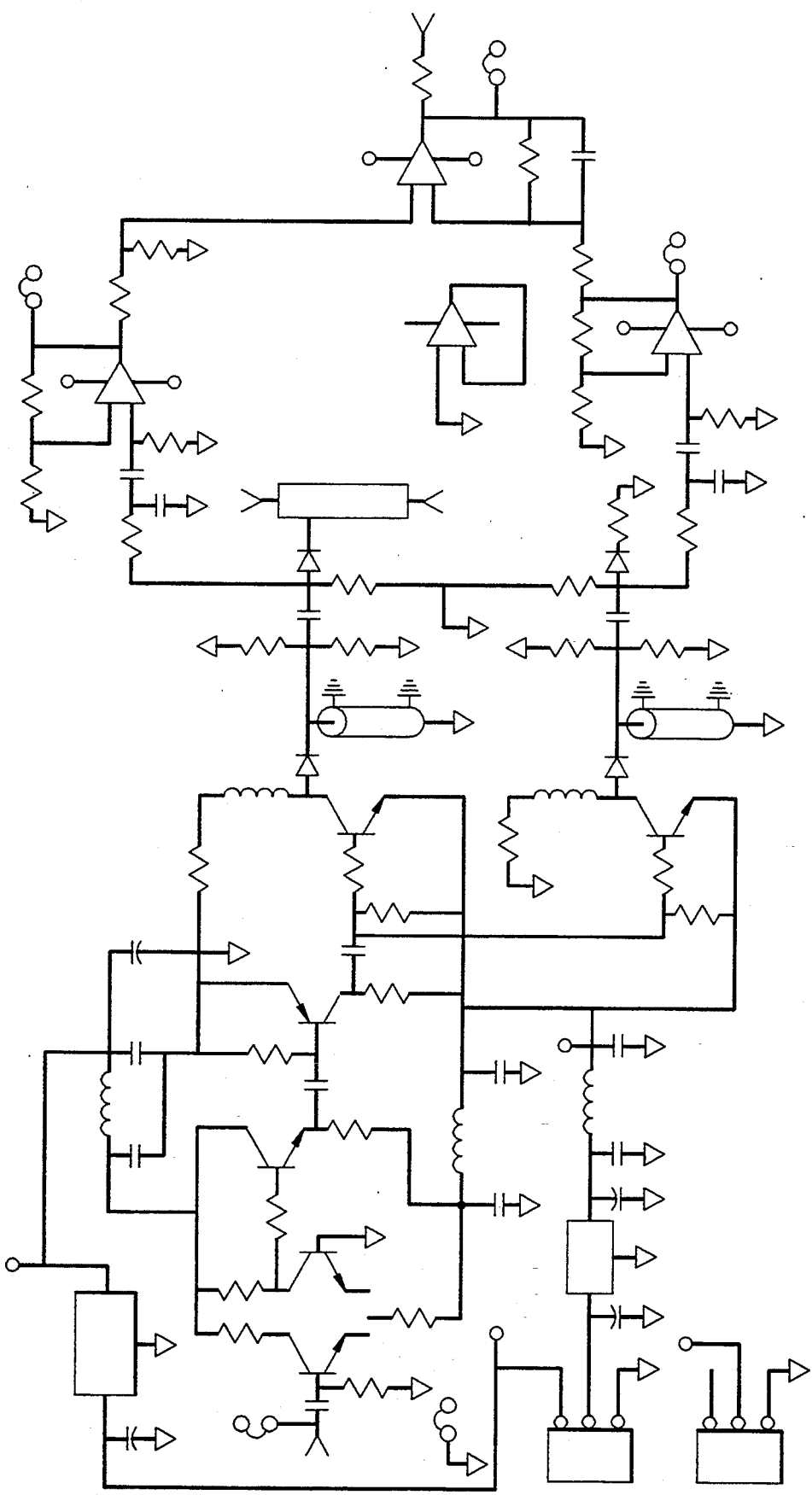
Figure 39:
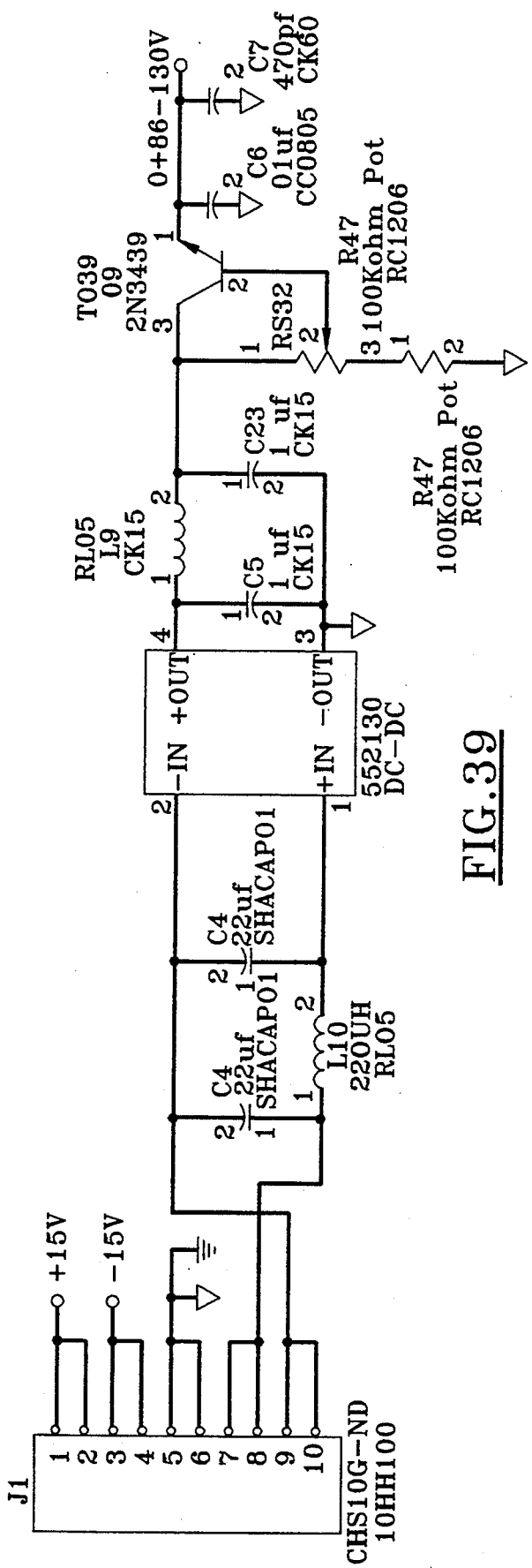
Figure 40:
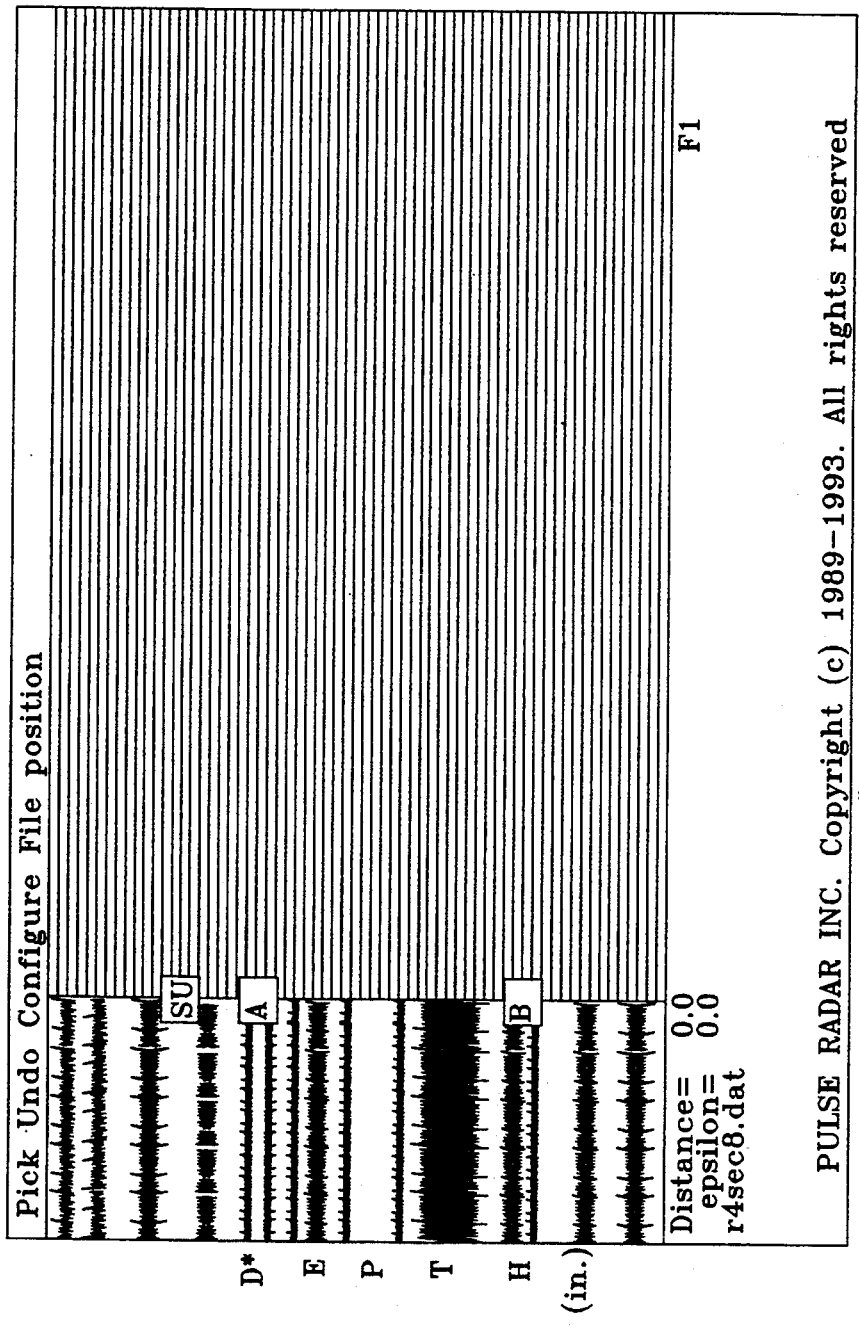
FIG. 40 is an illustration of the data retrieved by using the present invention.

FIGS. 28 through 33 are flow diagrams illustrating the software used to implement the present invention. FIG. 29 is a flow diagram illustrating the software used to supervise the data unit of the present invention. FIG. 30 is a flow diagram illustrating the software used in the present invention to capture radar data to a disk storage device and, simultaneously, to display the data. FIG. 31 is a flow diagram illustrating the software utilized by the present invention to display the radar data from a disk storage device as practiced in the present invention. FIG. 32 is a flow diagram illustrating one embodiment of software used in the present invention to capture radar data to a tape storage device and, simultaneously, display the data. And, FIG. 33 is a flow diagram illustrating the software utilized by the present invention to display the radar data from a tape storage device as practiced in the present invention.

The present invention can also be practiced as a method for determining the presence of and the size of voids and deterioration in a medium. The method includes gathering base line data in the medium where no voids or deterioration are likely to exist and thereafter gathering additional data in portions of the medium where voids and deterioration are likely to exist. The step of gathering base line information comprises the steps of: generating a first electromagnetic signal, emitting the first electromagnetic signal toward a portion of the medium where no void is likely to exist, accepting the first electromagnetic signal reflected from the medium where no void is likely to exist, digitizing an storing the received first electromagnetic signal for use as a reference sign. The step of determining the presence of and the size of voids and deterioration in the medium comprises the steps of generating a second electromagnetic signal, emitting the second electromagnetic signal toward the medium under consideration, moving the second emitted electromagnetic signal over the medium, accepting the second electromagnetic signal reflected from the medium, initiating a timing interval beginning upon reception of the second electromagnetic signal reflected from the surface of the medium, terminating the timing interval after a period of time sufficient to allow the second electromagnetic signal to penetrate the medium, accepting the second electromagnetic signal reflected at any interfaces in the medium having different dielectric properties, digitizing the received second electromagnetic signal reflected by the interfaces within the medium, storing the digitized second electromagnetic signal for manipulation and analysis, and analyzing the second electromagnetic signal based upon the information acquired in the first electromagnetic signal for determining the presence of and the size of voids and deterioration in the medium.

The step of analyzing the second electromagnetic signal comprises the steps of locating all local minimum values and all local maximum values in the second digitized signal, storing the located minimum values, the located maximum values and the associated times of occurrence, selecting the largest previously, unselected minimum values, selecting the largest of the maximum values occurring immediately after the selected minimum value, comparing the magnitude of the selected minimum values and the magnitude of the selected maximum values with a threshold value, if the selected values are greater than the threshold value then a void has been detected at the corresponding location within the medium, if the selected values are less than the threshold value then no void has been detected, if a void has been detected based upon the comparison with the threshold value, then, comparing the difference between the times of occurrence of the selected minimum value and the selected maximum value with a nominal value, if the time difference between the selected values exceeds the nominal value then the size of the void is determined by the difference between the time of occurrence of the selected minimum value and the time of occurrence of the selected maximum value, if the time difference between the selected values is less than the nominal value then the size of the void is determined by the greater magnitude of the selected minimum value an the selected value, and repeating the analysis steps by selecting the next largest minimum value, repeating the method, and ultimately proceeding through all of the largest minimum values until each has been evaluated for voids or deterioration.

More specifically, the step of comparing the magnitudes of the selected values with a threshold comprises comparing the magnitudes of the values selected from the second received electromagnetic signal with approximately 1.2 times the magnitude of the first received electromagnetic signal. Therefore, the first received electromagnetic signal which was acquired as a base line value must be exceed by a later received signal in order for a void to be indicated in the present method.

Preferably, in the step of comparing the time difference between the selected values with a nominal value further comprises comparing the time difference of the values selected from the second received electromagnetic signal with the time difference associated with approximately one-fourth of the wavelength of the first emitted electromagnetic signal. Thus, when the time difference between the first received electromagnetic signal and the second received electromagnetic signal is more than approximately one-fourth of the wavelength of the first emitted electromagnetic signal, the time difference between the two signals alone is used as a determination of the size of the void. However, if the time difference between the two received electromagnetic signals is less than approximately one-fourth of the wavelength of the first emitted electromagnetic signal then the received electromagnetic signal having the largest magnitude is used to determine the size of the void or deterioration in the medium.

The requirements for detecting and sizing voids are critical. Typically, a extremely short pulse of energy is needed to detect voids. A very high time resolution is required. Typically, the time resolution is high and associated with short distances from the medium being measured. Also a wide bandwidth, low pass, matched antenna is required. Lastly, a sensitive wide bandwidth receiver is required. To determine the presence or absence of a void using the present invention, the following method is utilized. A comparison is made of the magnitude of the largest values with a threshold value. The threshold value can be approximately 1.2 times the magnitude of the electromagnetic signal reflected from the structure where no void is likely to exist. If the values returned are greater than or equal to the threshold value a void had been detected. If the values are less than the threshold value no void has been detected.

To determine the size of a void requires additional analysis. The size of a void is determined by comparing the difference between the times of occurrence of the minimum and maximum value with a nominal value. The nominal value can be, for example approximately one fourth of the time difference of the frequency of the emitted electromagnetic signal. If the time is greater than or equal to the nominal value the size is determined by the difference between the times of occurrence of the minimum and maximum values. If the time is less than the nominal value the size is determined by the magnitude of the minimum/maximum signal.

It should be understood that all of the various and sundry components of this invention are well known and conventional per se, and some therefore may have been patented in their own right at some time in the past. Therefore, it is their interconnection and interactions that effect the new combinations of elements constituting this invention and cause the stated improved results and features to be achieved thereby.

Additional advantages and modifications will readily occur to those skilled in the art. The invention and its broader aspects is therefore not limited to the specific details, representative apparatus, and the illustrative examples shown and described herein. Accordingly, departures may be made from the detail without departing from the spirit or scope of the disclosed general inventive concept.

What is claimed is:

1. A pulse radar system for determining the subsurface structure of a non-metallic medium using a reflected signal representative of the subsurface structure comprising:

(a) a controller for generating and receiving electronic signals including a pulser trigger signal and a sampler trigger signal; and (b) an integrated, monocoque microwave unit for incorporating all the microwave components associated with the pulse radar system such that all the components are in close microwave communication one with the other and all communication of microwaves between components is maintained in and restricted to the integrated microwave unit, the integrated microwave unit comprising (1) at least one antenna unit comprising (A) at least one former of low dielectric material having a generally triangular shape with an apex at one end, a bottom at the other end and legs extending there between and having two substantially parallel sides.such that as the legs extend from the apex to the base splayed surfaces are formed between the sides, and further as the splayed surfaces approach the bottom, the splayed surfaces are flared for expanding in shape at a rate greater than the splayed portion of the surfaces near the apex, (B) a first and second support member of low dielectric material each support member having a planar configuration for engaging the splayed and flared surfaces of the former such that the support members are shaped to conform to the splayed-flared surface configuration, and (C) a first and second antenna leaf operationally engaged with the first and second support members, respectively, for operating in the transverse electromagnetic (TEM) mode, (2) a plurality of spacers of low dielectric material for engagement with the sides of the formers for secureally fixing the antenna units in positional relationship and extending from the antenna unit, (3) a base of low dielectric material for engagement with the bottoms of the formers and the spacers for rigidly securing the antenna units in positional relationship for forming a monocoque structure comprising the antenna unit, the spacers and the base, (4) a plurality of covers of low dielectric material for engagement with the base and the spacers for protecting the antenna leafs and support members, (5) an intermediate member securely fixed to the spacers and the covers which extends from the antenna unit, (6) a top of low dielectric material for engagement with the formers and the covers for forming an enclosure bounded by the top, the formers, the covers and the intermediate member, (7) a pulser integral with the microwave unit and located in the enclosure for receiving the pulser trigger signal from the controller and for generating microwave pulses, the pulser for providing microwave pulses to the antenna unit, and (8) a sampler integral with the microwave unit and located in the enclosure for receiving the reflected signal from the antenna unit.

2. A pulse radar system for determining the subsurface structure of a non-metallic medium as defined in claim 1 further comprising a data unit for receiving signals from the controller and for analyzing, generating and displaying data.

3. A pulse radar system for determining the subsurface structure of a non-metallic medium as defined in claim 1 wherein the antenna unit comprises an air-coupled, horn, antenna in close proximity to the pulser for operating in the transverse electromagnetic (TEM) mode sufficient for transmitting a non-dispersed, broadband of frequencies ranging from approximately 100 MHz to above 2.0 GHz.

4. A pulse radar system for determining the subsurface structure of a non-metallic medium as defined in claim 1 further comprising a high absorption, low reflectivity material surrounding the antenna unit.

5. A pulse radar system for determining the subsurface structure of a non-metallic medium as defined in claim 1 wherein the low dielectric material is Polystyrene ®.

6. A pulse radar system for determining the subsurface structure of a non-metallic medium as defined in claim 1 wherein the low dielectric material is Styrofoam ®.

7. A pulse radar system for determining the subsurface structure of a non-metallic medium as defined in claim 1 wherein the pulser comprises a first microwave transmission line for replicating a positive-going microwave pulse, and a second microwave transmission line for replicating a negative-going pulse such that the positive-going microwave pulse and the negative-going microwave pulse are precisely fitted together to form a monocycle microwave pulse whereby at least one microwave transmission line comprises a planar waveguide structure.

8. A pulse radar system for determining the subsurface structure of a non-metallic medium as defined in claim 7 wherein the planar waveguide structure comprises a coplanar waveguide structure.

9. A pulse radar system for determining the subsurface structure of a non-metallic medium as defined in claim 7 wherein the planar waveguide structure comprises a microstrip waveguide structure.

10. A pulse radar system for determining the subsurface structure of a non-metallic medium as defined in claim 1 wherein the controller is housed in the enclosure of the integrated, monocoque microwave unit.

* * * * *